(12) United States Patent
Jia et al.

(10) Patent No.: US 12,124,011 B2
(45) Date of Patent: Oct. 22, 2024

(54) OPTICAL LENS INCLUDING SEVEN LENSES OF –+–+–+– REFRACTIVE POWERS, CAMERA MODULE, AND TERMINAL

(71) Applicant: HUAWEI TECHNOLOGIES CO., LTD., Guangdong (CN)

(72) Inventors: Yuanlin Jia, Dongguan (CN); Yong Zhou, Dongguan (CN); Hongfu Chen, Dongguan (CN); Shaofei Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 617 days.

(21) Appl. No.: 17/387,311

(22) Filed: Jul. 28, 2021

(65) Prior Publication Data

US 2021/0356713 A1 Nov. 18, 2021

Related U.S. Application Data

(63) Continuation of application No. PCT/CN2020/106622, filed on Aug. 3, 2020.

(30) Foreign Application Priority Data

Sep. 30, 2019 (CN) .......................... 201910962177.2

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 10,241,298 B1 | 3/2019 | Oinuma et al. |
| 2015/0124333 A1 | 5/2015 | Noda et al. |

(Continued)

FOREIGN PATENT DOCUMENTS

| CN | 102955216 A | 3/2013 |
| CN | 206757163 U | 12/2017 |

(Continued)

OTHER PUBLICATIONS

Extended European Search Report issued in European Application No. 20871292.7 on Feb. 14, 2022, 8 pages.

(Continued)

*Primary Examiner* — Wen Huang
(74) *Attorney, Agent, or Firm* — Fish & Richardson P.C.

(57) ABSTRACT

This application provides an example optical lens, an example camera module, and an example terminal. One example lens includes a first lens with a negative focal power, a second lens with a positive focal power, a third lens with a negative focal power, a fourth lens with a positive focal power, a fifth lens with a positive focal power, a sixth lens with a focal power, and a seventh lens with a focal power that are sequentially arranged along an optical axis from an object side to an image side. The first lens includes an object side surface that is concave near the optical axis and an image side surface that is convex near the optical axis. The seventh lens is an M-shaped lens and includes an object side surface that is convex near the optical axis and an image side surface that is concave near the optical axis.

20 Claims, 24 Drawing Sheets

(56) References Cited

U.S. PATENT DOCUMENTS

| | | | |
|---|---|---|---|
| 2016/0154210 A1 | 6/2016 | Baik et al. |
| 2017/0059826 A1 | 3/2017 | Tang et al. |
| 2017/0184819 A1 | 6/2017 | Shi |
| 2017/0212333 A1 | 7/2017 | Huang |

FOREIGN PATENT DOCUMENTS

| | | | |
|---|---|---|---|
| CN | 108663782 A | 10/2018 |
| CN | 208076814 U | 11/2018 |
| CN | 109387925 A | 2/2019 |
| CN | 109752826 A | 5/2019 |
| CN | 109828345 A | 5/2019 |
| IN | 109375351 A | 2/2019 |
| JP | 2005208464 A | 8/2005 |
| JP | 2015072404 A | 4/2015 |

OTHER PUBLICATIONS

Office Action issued in Chinese Application No. 201910962177.2 on Jul. 14, 2021, 15 pages (with English translation).

PCT International Search Report and Written Opinion issued in International Application No. PCT/CN2020/106622 on Oct. 26, 2020, 13 pages (partial English translation).

Wu, "A Complete Manual of Digital Camera Exchangeable Lenses," Zhejiang Photography Publishing House, Jan. 2015, 11 pages (with English abstract).

Handbook of Optical Systems, vol. 3: Aberration Theory and Correction of Optical Systems, Wiley-Vch, Jan. 2007, Chapter 31, 34 pages.

EP Communication Pursuant to Article 94(3) EPC in European Appln No. 20871292.7, dated Mar. 11, 2024, 7 pages.

OPTICAL LENS INCLUDING SEVEN LENSES OF −+−+−+− REFRACTIVE POWERS, CAMERA MODULE, AND TERMINAL

CROSS-REFERENCE TO RELATED APPLICATIONS

This application is a continuation of International Application No. PCT/CN2020/106622, filed on Aug. 3, 2020, which claims priority to Chinese Patent Application No. 201910962177.2, filed on Sep. 30, 2019. The disclosures of the aforementioned applications are hereby incorporated by reference in their entireties.

TECHNICAL FIELD

Embodiments of this application relate to the field of lenses, and specifically, to an optical lens, a camera module, and a terminal.

BACKGROUND

In an imaging system, an aperture value F# is an important indicator of a lens of the imaging system. The aperture value F# directly affects core functions of the imaging system such as nightscape, snapping, a video, and bokeh. A large/ultra-large aperture (a smaller F# value) can enable the imaging system to receive more photon energy, so that the system can also image clearly in a low-illumination environment. An imaging advantage of a large-aperture/ultra-large-aperture lens in the low-illumination environment enables the lens to have increasingly wide application in a security camera, a mobile phone camera, and a vehicle-mounted camera.

SUMMARY

Embodiments of this application provide an optical lens with an ultra-large aperture, to enable the optical lens to be also used in a low-illumination environment.

According to a first aspect, this application provides an optical lens. The optical lens includes a plurality of coaxially disposed lenses. The plurality of coaxially disposed lenses include a first lens, a second lens, a third lens, a fourth lens, a fifth lens, a sixth lens, and a seventh lens that are disposed in sequence from an object side to an image side. The first lens has a negative focal power, an object side surface of the first lens is concave in a paraxial position, and an image side surface of the first lens is convex in a paraxial position. The second lens has a positive focal power. The third lens has a negative focal power. The fourth lens has a positive focal power. The fifth lens has a negative focal power. The sixth lens and the seventh lens each have a focal power. An object side surface of the seventh lens is convex in a paraxial position, and an image side surface of the seventh lens is concave in a paraxial position. An aperture value F# of the optical lens meets: $0.6 \leq F\# \leq 2.0$.

When structures of the lenses of the optical lens in this embodiment of this application meet the foregoing structures, the aperture value in this embodiment of this application can meet: $0.6 \leq F\# \leq 2.0$. Compared with an optical lens in the current technology, the optical lens in this embodiment of this application can have a smaller F# value, so that the optical lens has a larger aperture and can also perform well in a low-illumination environment.

In some embodiments, the seventh lens is an M-shaped lens, and there are two symmetrical inflection points on each of surface inclination angles of the object side surface and the image side surface of the M-shaped lens except for a vertex center. In this embodiment, an axial section of the seventh lens is M-shaped. An M-shaped lens structure can effectively increase a chief ray incident angle of an optical lens, so that the lens can match a photosensitive element with a large chief ray incident angle, thereby reducing manufacturing costs.

In some embodiments, the plurality of coaxially disposed lenses include at least one glass lens and at least one plastic lens. A refractive index of the glass lens changes with a temperature, and the refractive index and the temperature meet: $dn/dT>0$; and a refractive index of the plastic lens changes with a temperature, and the refractive index and the temperature meet: $dn/dT<0$, where dn represents a change value of a refractive index per unit time, and dT represents a change value of a temperature per unit time.

In this embodiment of this application, the plurality of lenses include at least one glass lens and at least one plastic lens. That is, the optical lens in this application uses a combination of the glass lens and the plastic lens. Compared with an optical lens using only glass lenses, the optical lens in this application has lower costs. In addition, because dn/dT of the glass lens is greater than 0, and dn/dT of the plastic lens is less than 0, in a case of a temperature change, a warm-up drift of the optical lens is less than that of the optical lens using only glass lenses or an optical lens using only plastic lenses.

In some embodiments, a refractive index of the second lens in light with a wavelength of 587.6 nm meets: $1.4 \leq nd \leq 2.1$.

In some embodiments, the optical lens meets: $F\#^2 \times TTL/IH \geq 2.0$, where F# is the aperture value of the optical lens, IH is an image height of the optical lens, TTL is a total track length of the optical lens, and the symbol "×" between $F\#^2$ and TTL is a multiplication sign. In this embodiment of this application, the optical lens meets: $F\#^2 \times TTL/IH \geq 2.0$, thereby further providing a lens with a small total length (a small TTL) under a premise of meeting requirements of a large aperture and a large quantity of pixels.

In some embodiments, a curvature radius R1 of the object side surface of the first lens in the paraxial position and a curvature radius R2 of the image side surface of the first lens in the paraxial position meet: $0.2 \leq R1/R2 < 0$. In this embodiment of this application, a range of a ratio of the curvature radius of the object side surface of the first lens to the curvature radius of the image side surface of the first lens is specified, indicating a light-converging capability of the first lens, thereby helping reduce a coma and an axial chromatic aberration that are of a system. In addition, the ratio of the curvature radius of the object side surface of the first lens to the curvature radius of the image side surface of the first lens indicates degrees of concavity and convexity of the image side surface and the object side surface of the first lens, thereby helping reduce the total track length of the optical lens, and obtaining a thinner terminal.

In some embodiments, a focal length f2 of the second lens and a focal length f of the lens meet: $f2/f \geq 1.0$.

In some embodiments, a focal length f4 of the fourth lens and the focal length f of the lens meet: $f4/f \leq 1.5$.

In some embodiments, a first step structure is disposed around an edge of an object side surface or image side surface of at least one of the plurality of coaxially disposed lenses, that is, the first step structure is disposed around the edge of the lens. The first step structure includes a first area, a second area, and a third area connected between the first area and the second area. The first area is closer to the edge of the lens relative to the second area. A distance from a reference plane to a position in which the first area and the third area are connected is different from a distance from the reference plane to a position in which the second area and the third area are connected. The reference plane is perpendicular to an extension direction of an optical axis of the lens. A second step structure is disposed around an edge of the lens adjacent to the lens provided with the first step structure, that is, the second step structure is disposed around the edge of the lens. The second step structure includes a fourth area, a fifth area, and a sixth area connected between the fourth area and the fifth area. The fourth area is closer to the edge of the lens relative to the fifth area. A distance from the reference plane to a position in which the fourth area and the sixth area are connected is different from a distance from the reference plane to a position in which the fifth area and the sixth area are connected. At least a part of the first area is in contact with at least a part of the fourth area, and at least a part of the third area is in contact with at least a part of the sixth area.

In some embodiments, an included angle between the third area and an optical axis of the lens provided with the third area is θ, and a range of θ meets the following condition: 0°<θ<45°, thereby implementing that the first area C1 and the fourth area D1 can fit more tightly together, and the third area C3 and the sixth area D3 can fit more tightly together when the adjacent lenses are mounted.

In some embodiments, a difference h between the distance from the reference plane to the position in which the first area and the third area are connected and the distance from the reference plane to the position in which the second area and the third area are connected meets the following condition: 0.08 mm≤h≤0.4 mm.

In some embodiments, a length L of a contact area between the first area and the fourth area in a radial direction meets the following condition: 0.2 mm≤L≤0.8 mm. The radial direction is perpendicular to the optical axis of the lens including the first area. In addition, the third area C3 and the sixth area D3 fit tightly together, thereby enabling more stable contact between the first step structure and the second step structure, and ensuring a more stable positional relationship between the lens and the lens adjacent to the lens. In some embodiments, the second lens is a glass lens, and the third lens to the seventh lens are plastic lenses. Each of object side surfaces of the fourth lens to the seventh lens is provided with the first step structure, and each of image side surfaces of the third lens to the sixth lens is provided with the second step structure. The object side surface of the lens provided with the first step structure is in contact with the image side surface of the adjacent lens provided with the second step structure.

According to a second aspect, this application further provides a camera module. The camera module includes a photosensitive element and the foregoing optical lens. The photosensitive element is located on an image side of the optical lens, and the photosensitive element is configured to convert, into an electrical signal, an optical image formed by the optical lens.

Because the optical lens in this application has a comparatively large aperture and can also perform well in a low-illumination environment, the camera module including the optical lens can also perform well in the low-illumination environment.

According to a third aspect, this application further provides a terminal, including a processor and the foregoing camera module. The camera module is configured to: obtain image data and input the image data into the processor, and the processor is configured to process the image data.

Because the camera module in this application can also perform well in a low-illumination environment, the terminal including the camera module can also perform well in the low-illumination environment.

Figure 6:
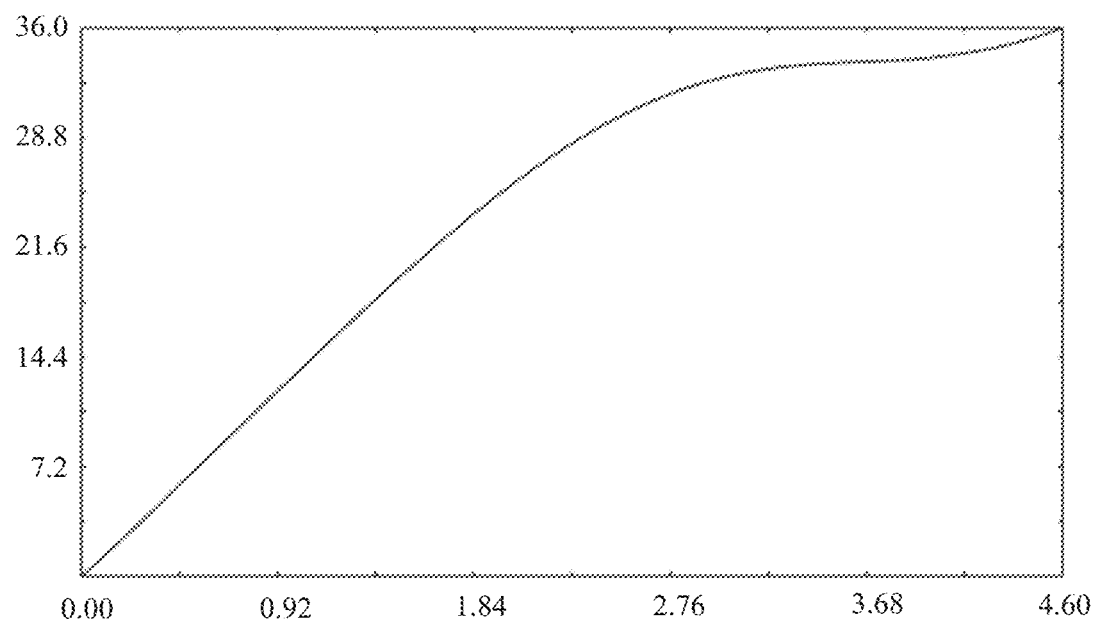
Figure 7A:
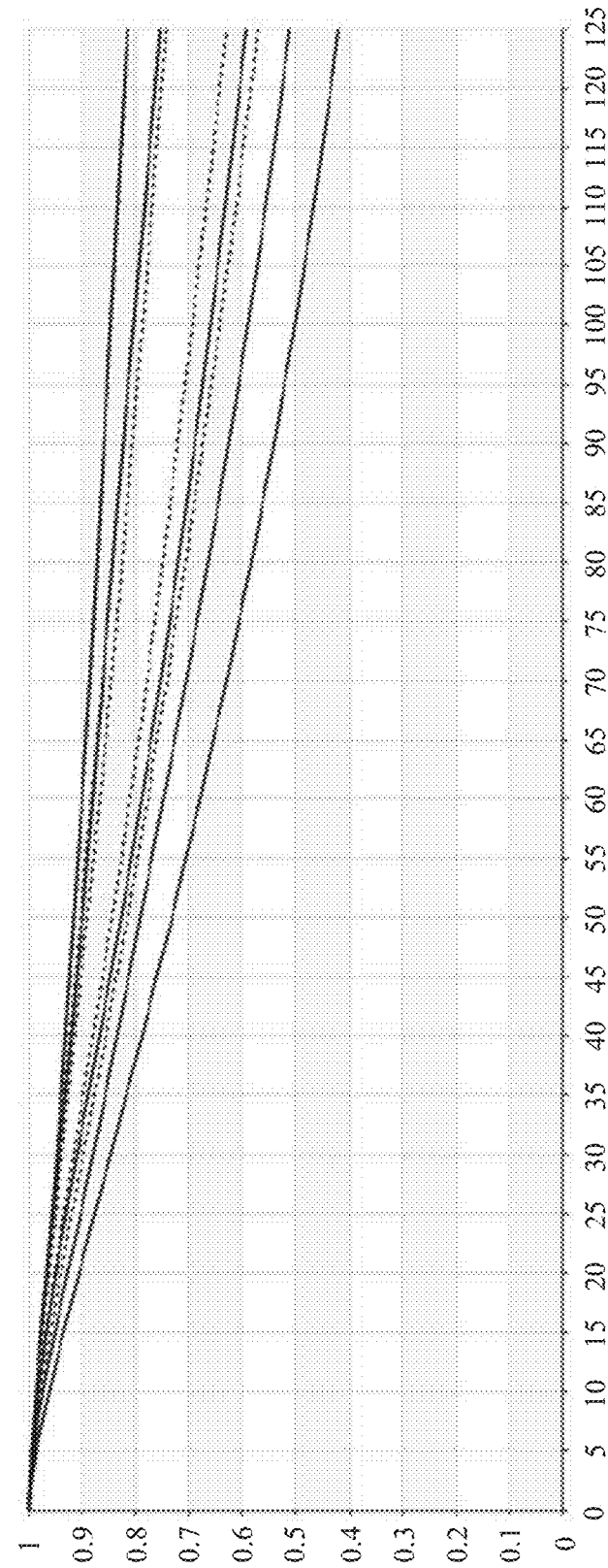
Figure 7B:
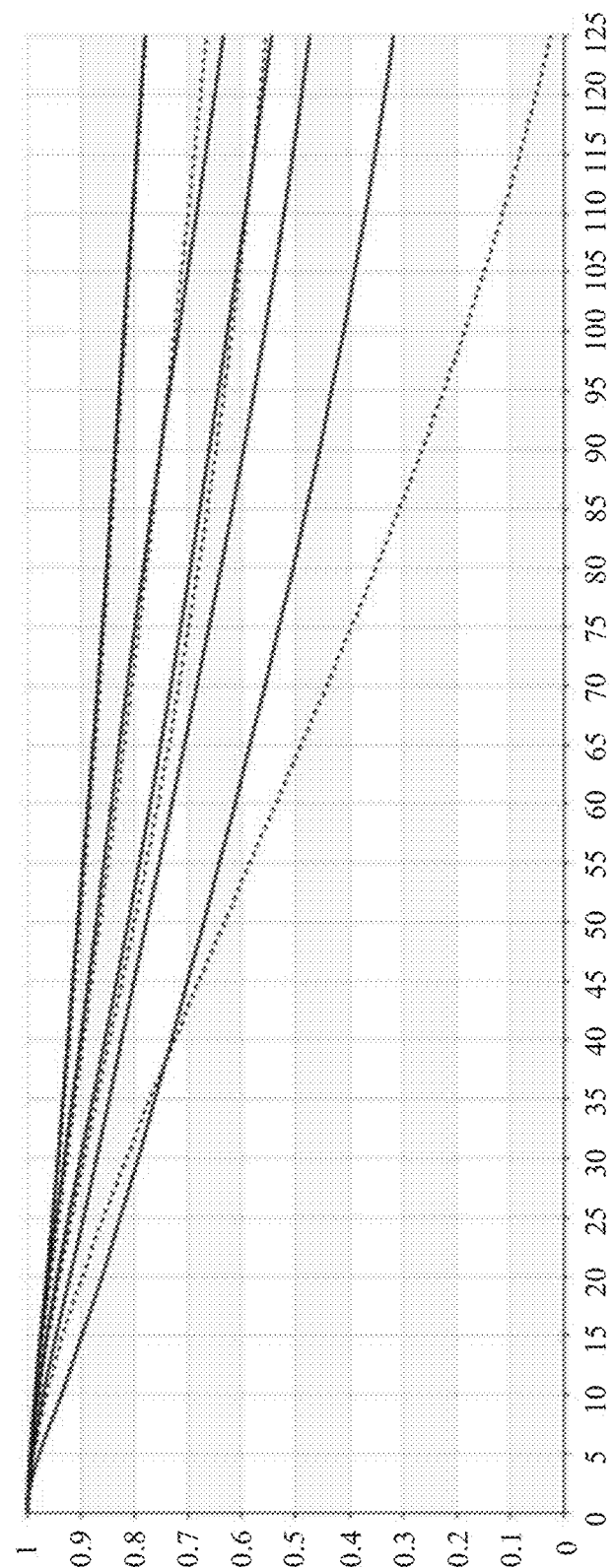
Figure 7C:
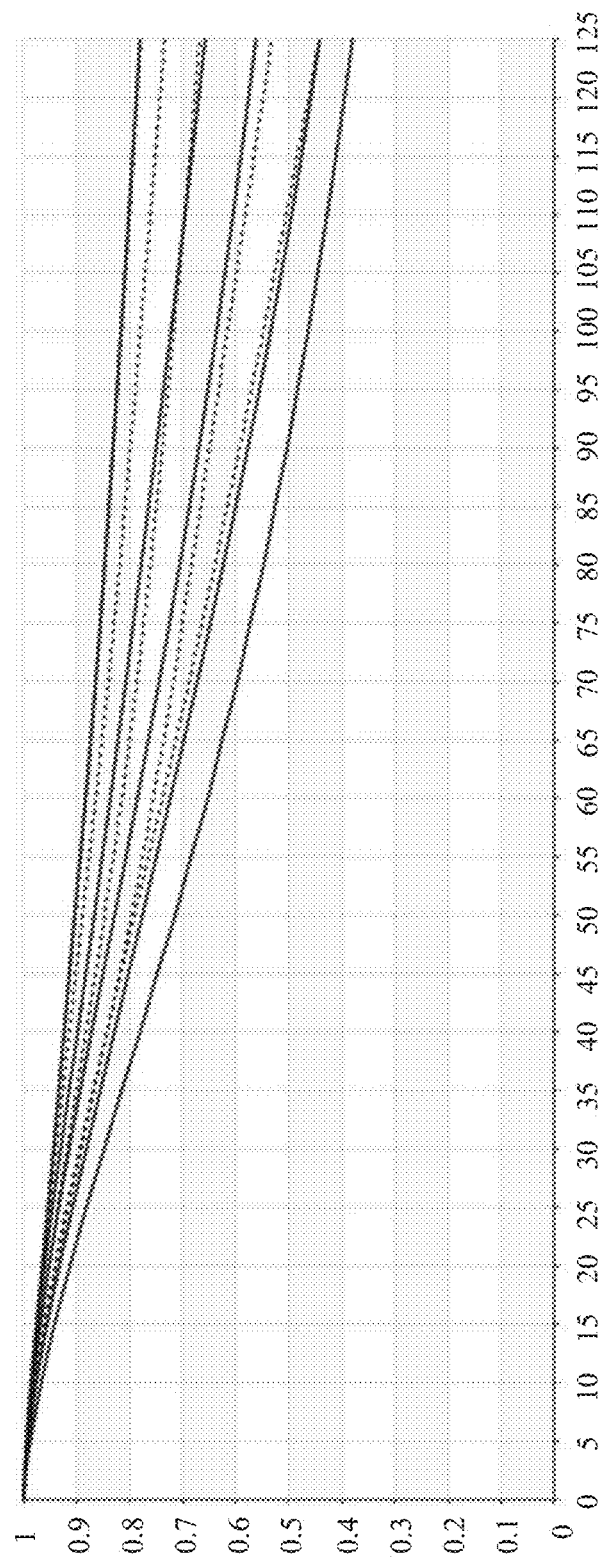
Figure 8:
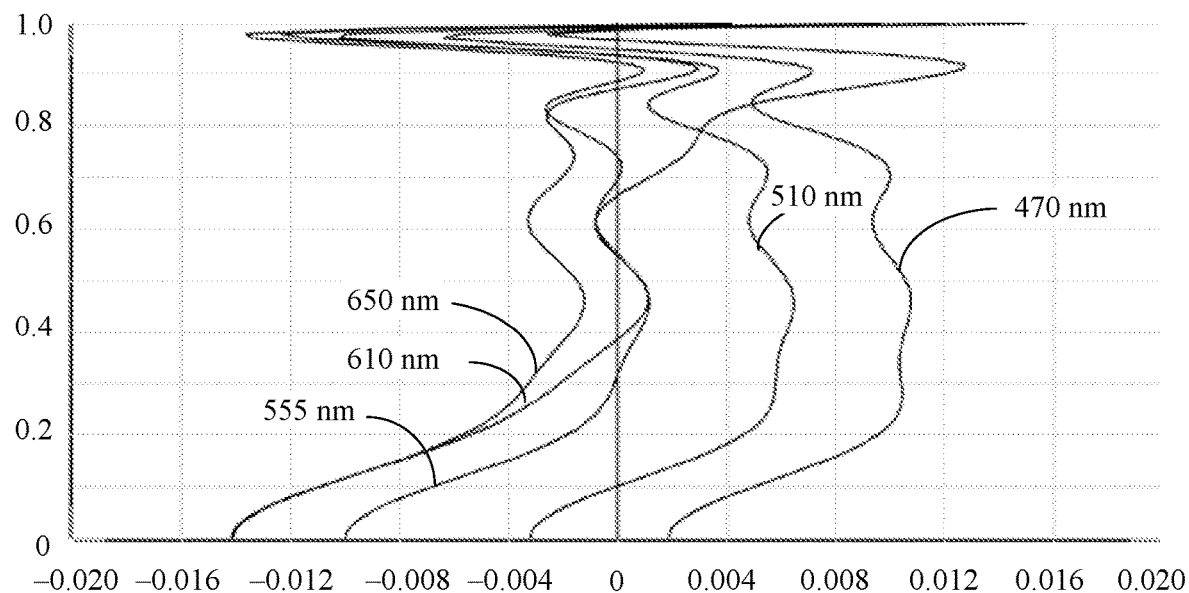
Figure 9:
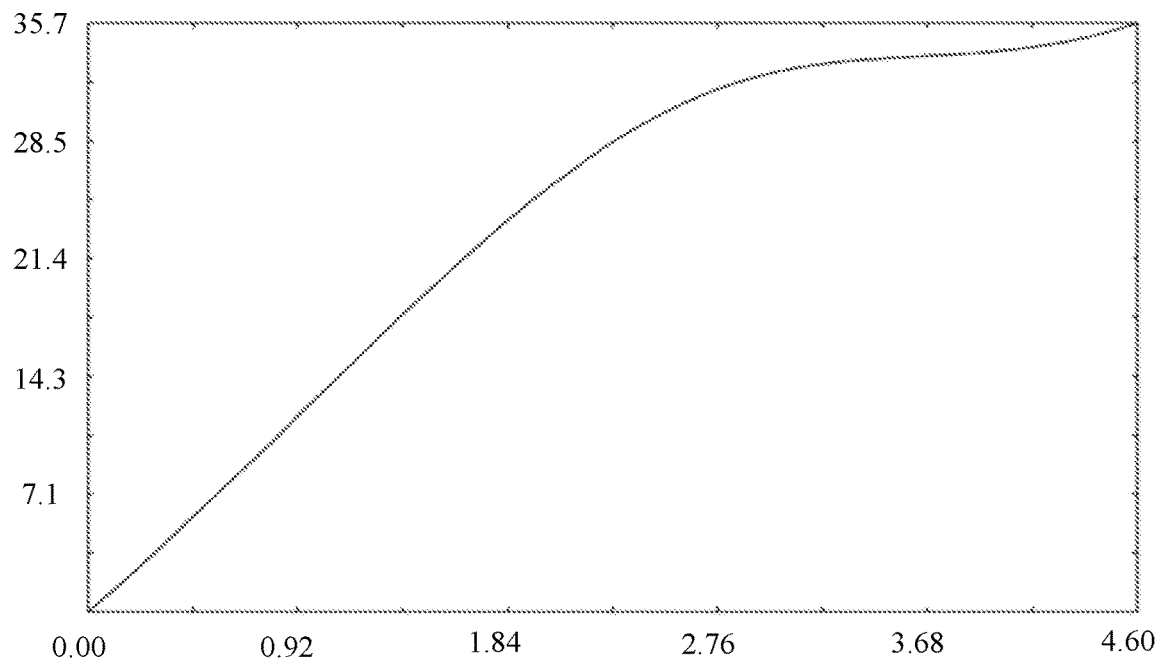
Figure 10A:
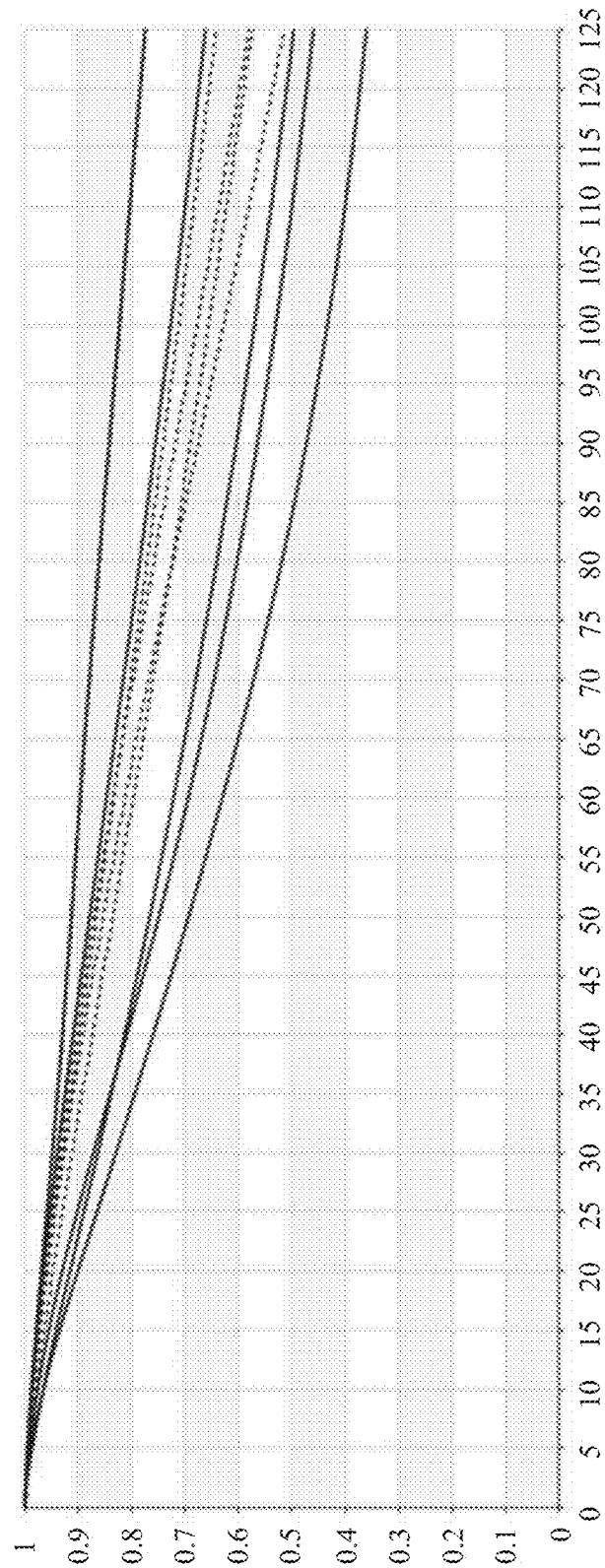
Figure 10B:
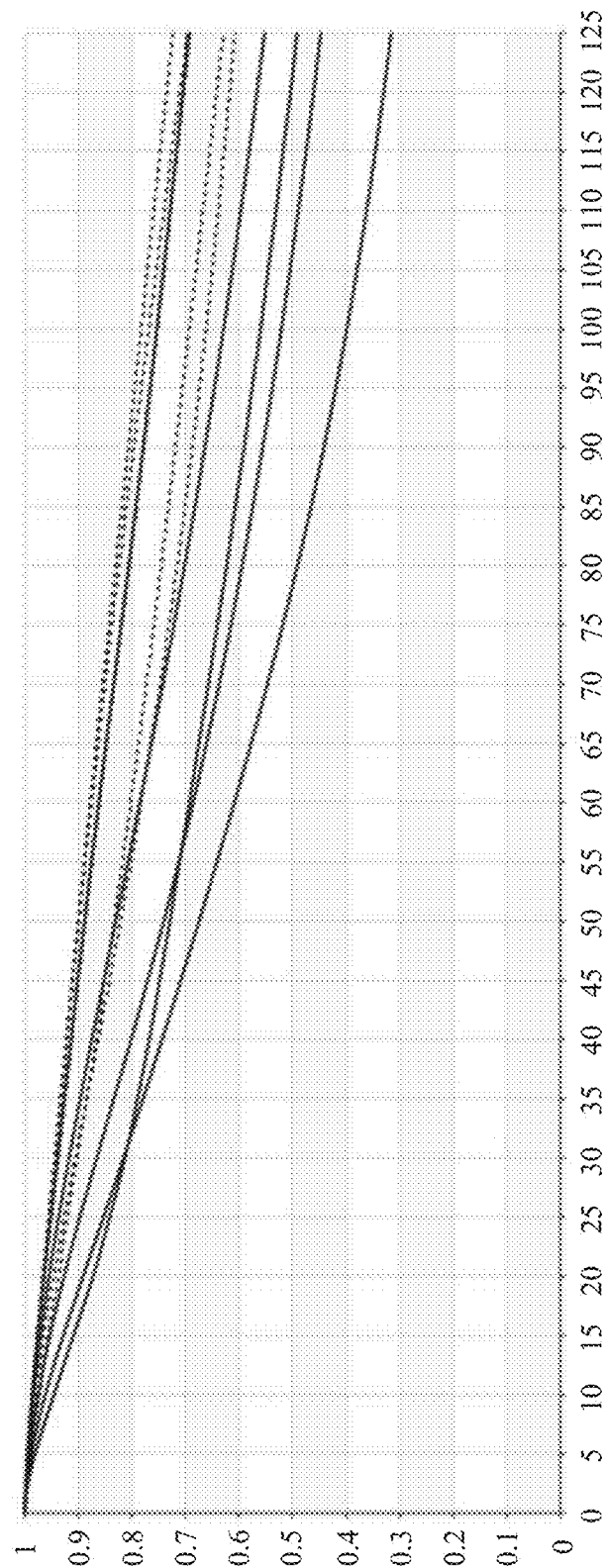
Figure 10C:
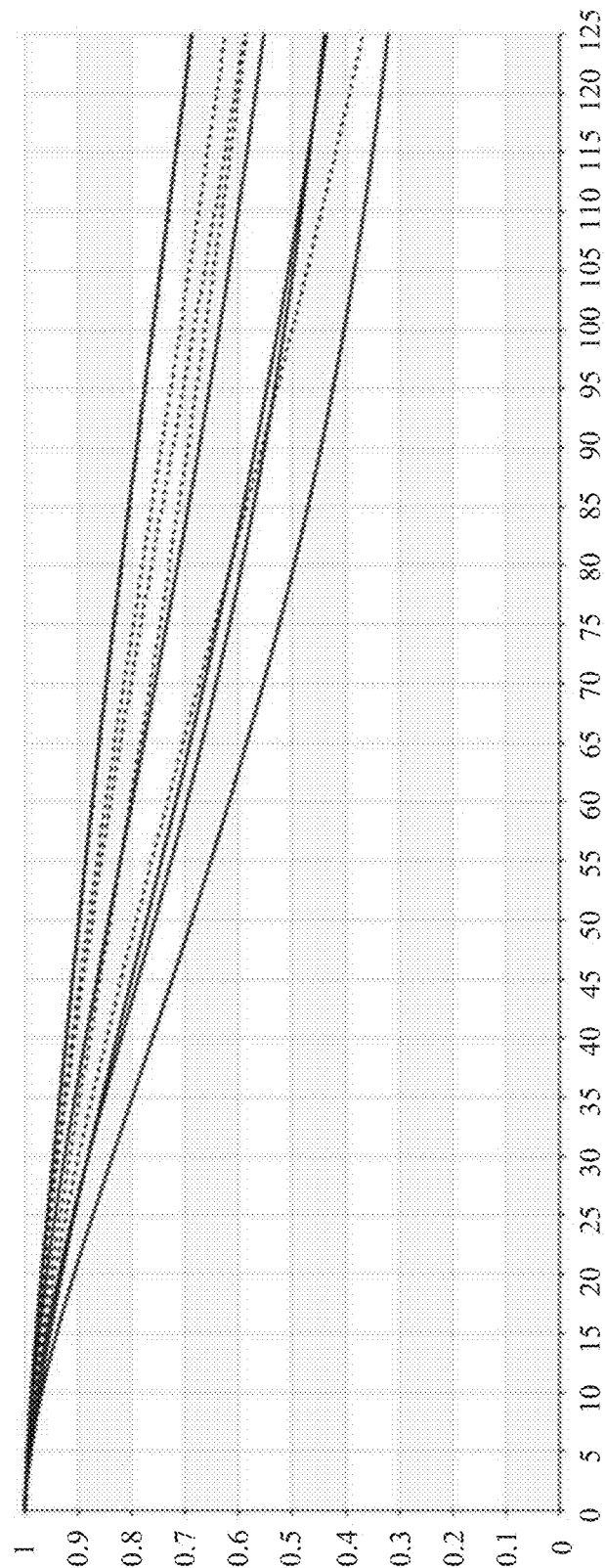
Figure 11:
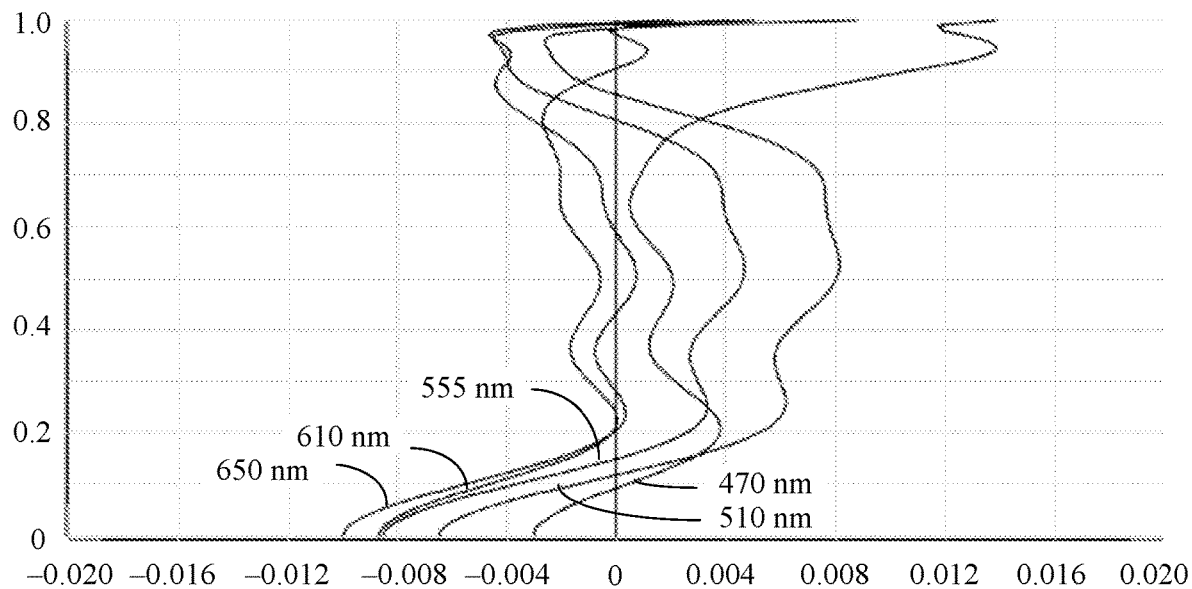
Figure 12:
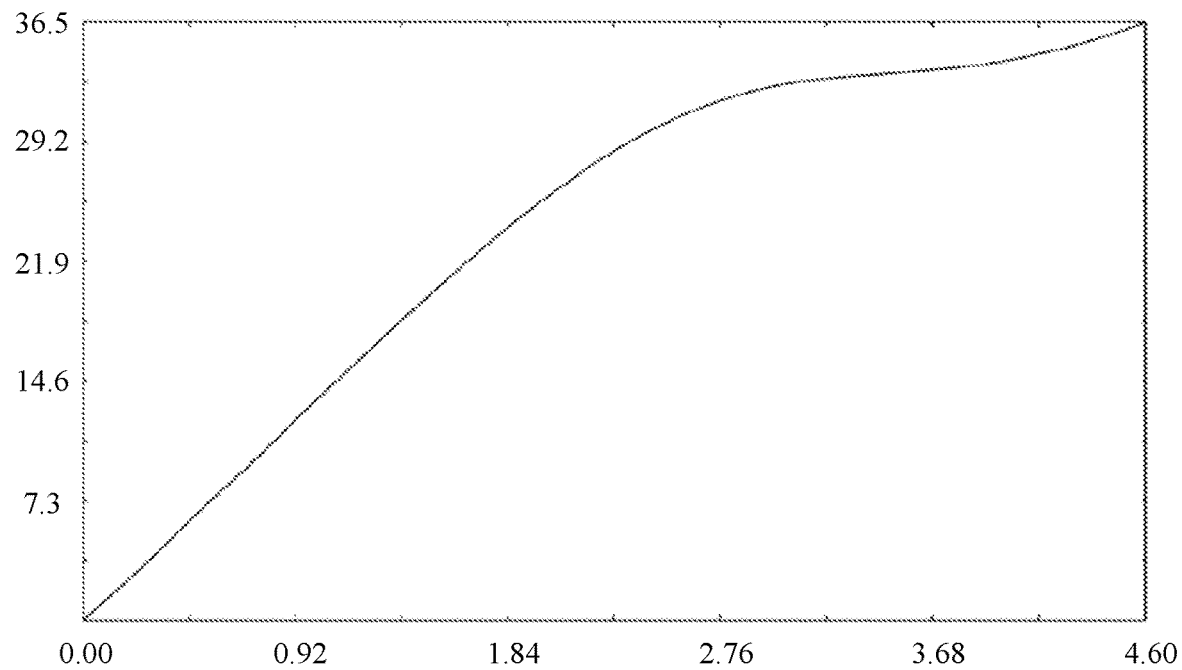
Figure 13A:
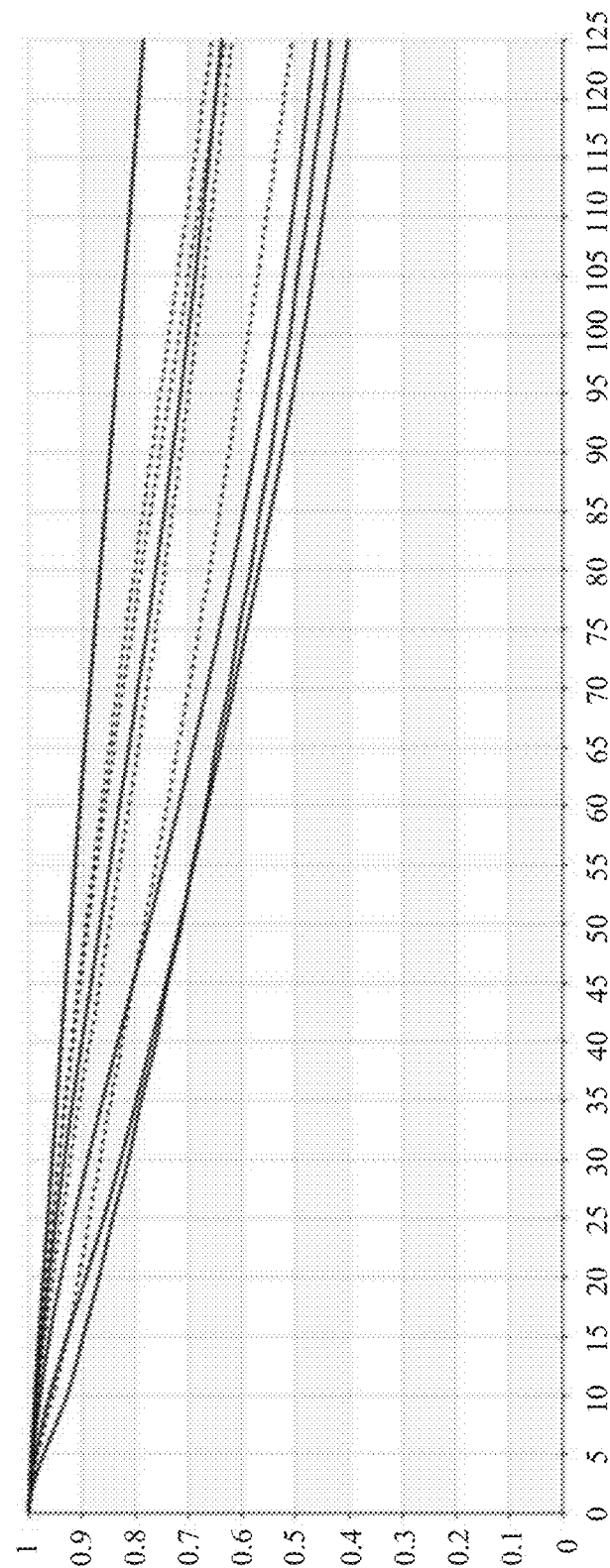
Figure 13B:
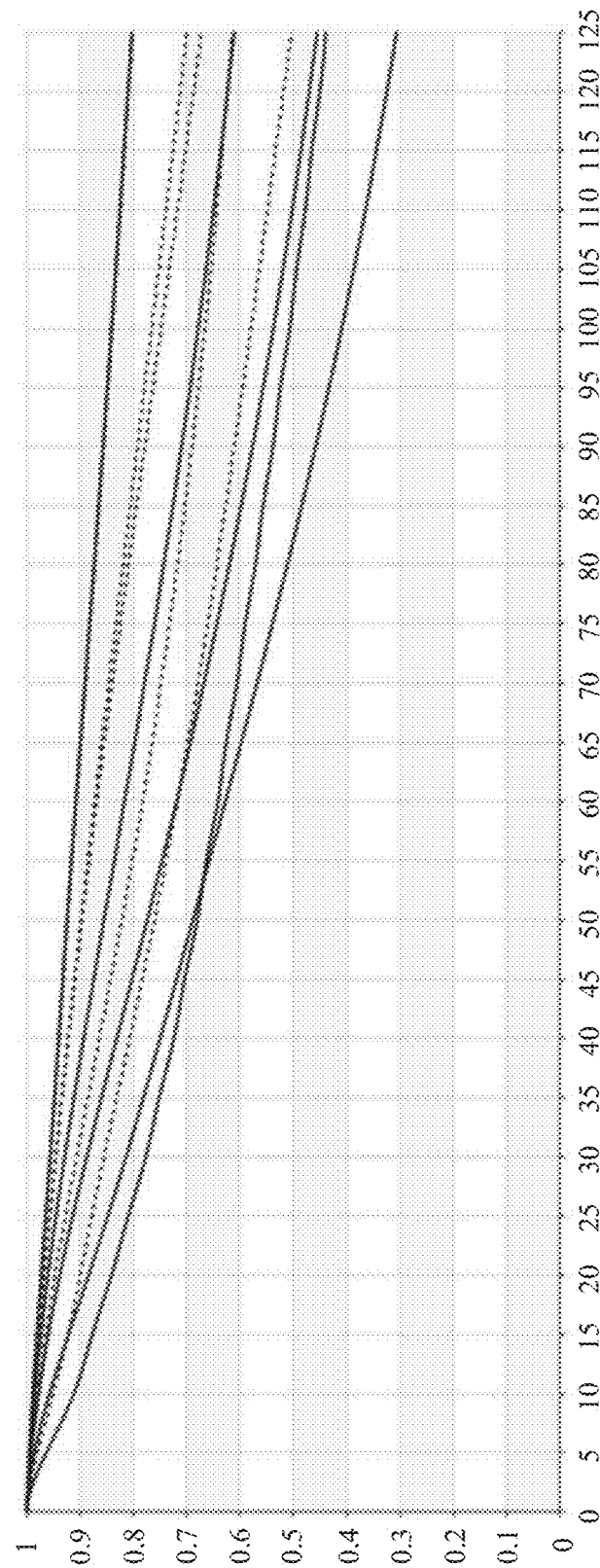
Figure 13C:
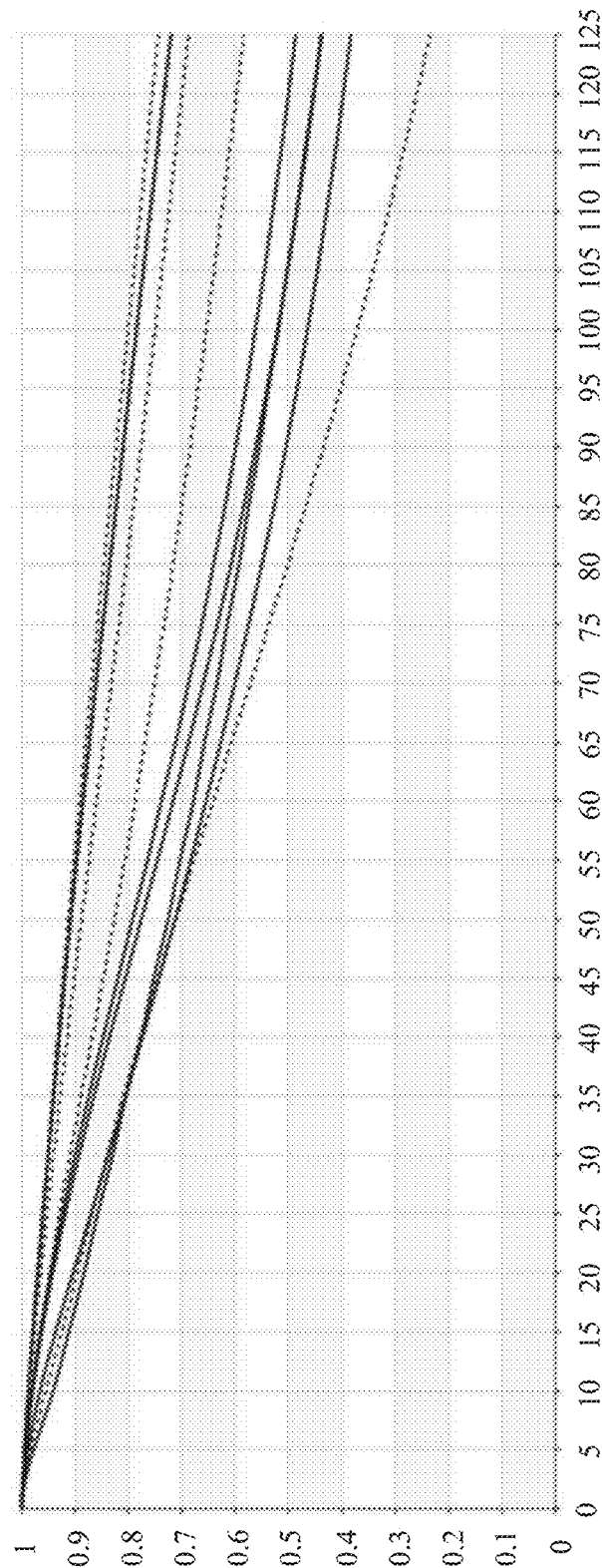
Figure 14:
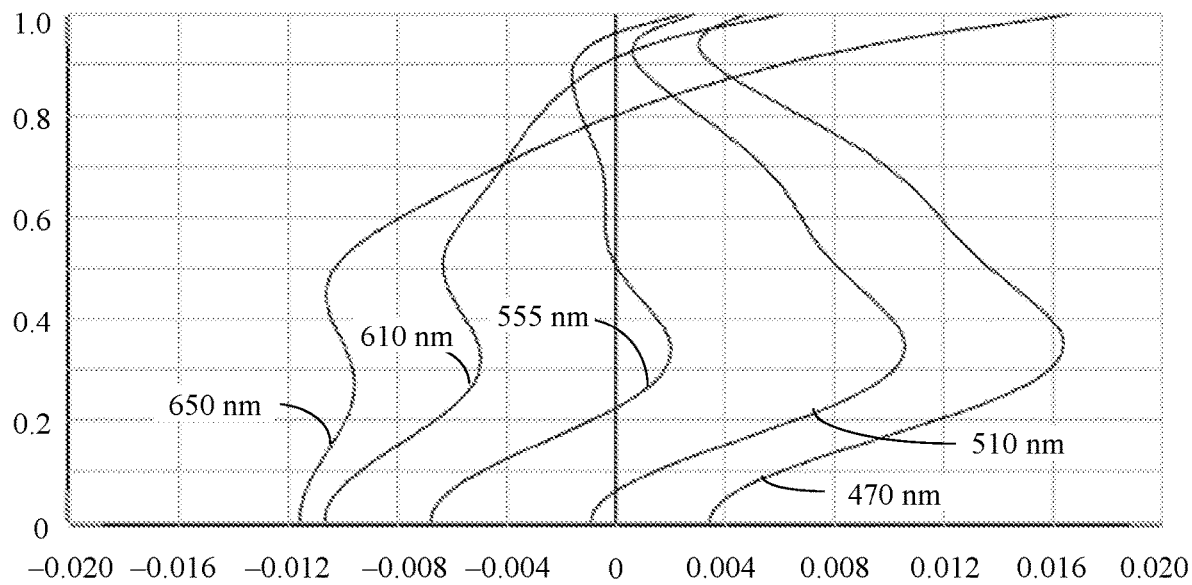
Figure 15:
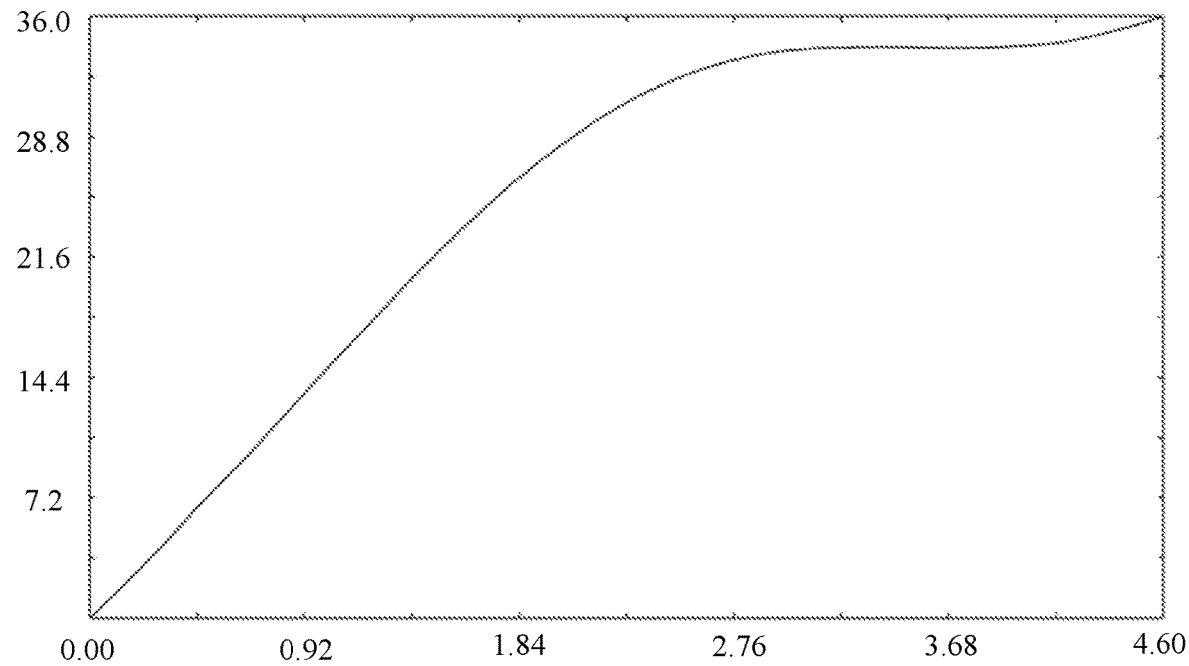
Figure 16A:
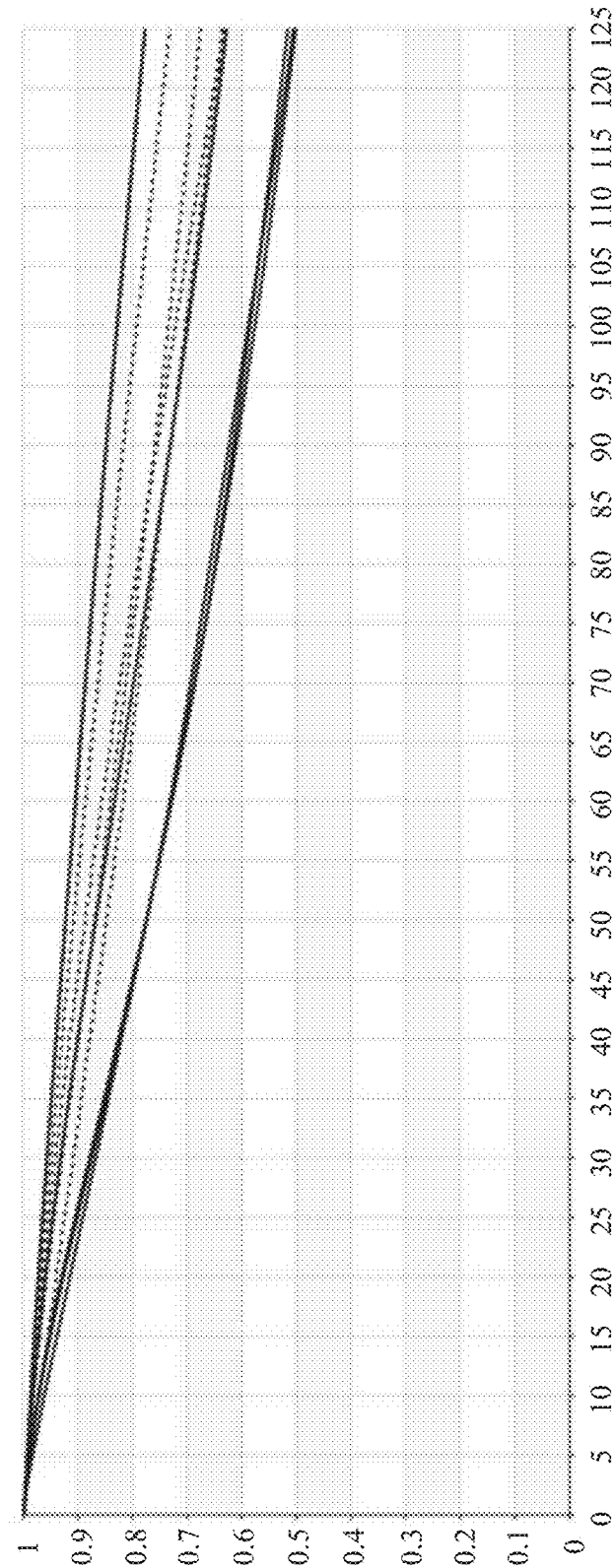
Figure 16B:
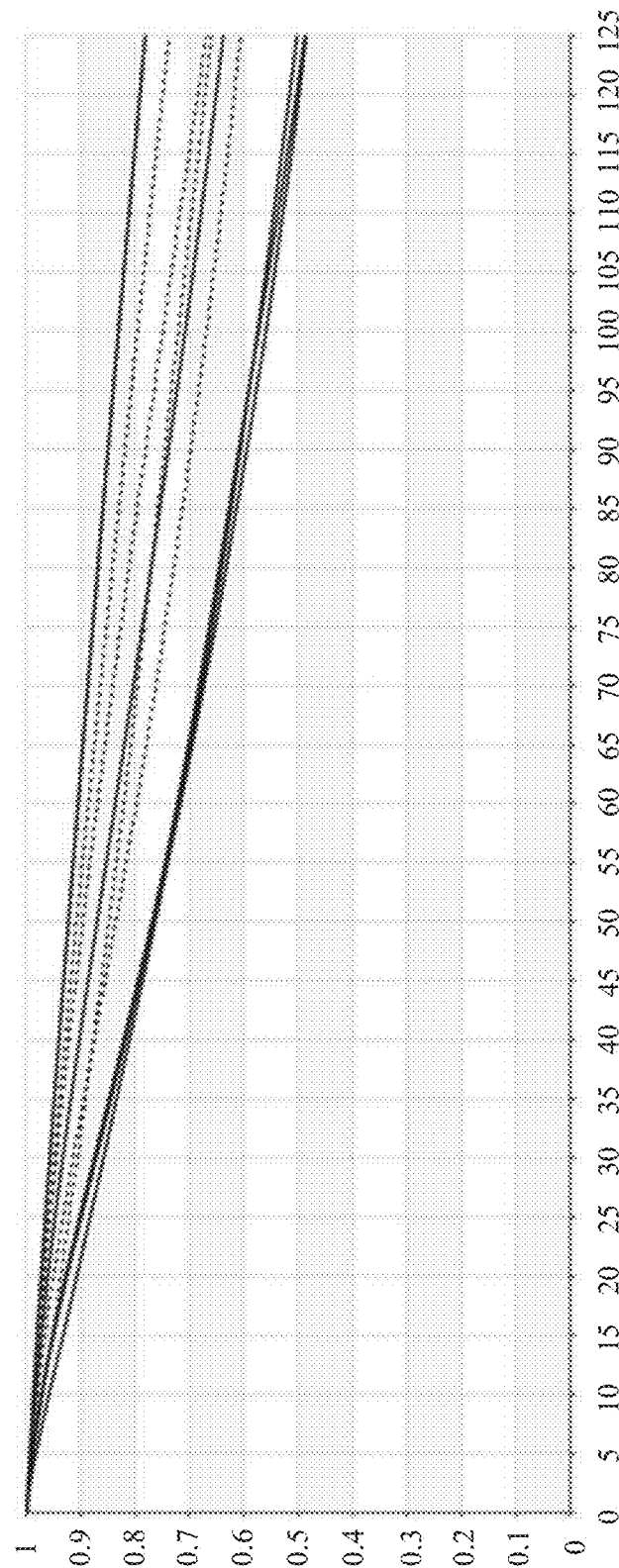
Figure 16C:
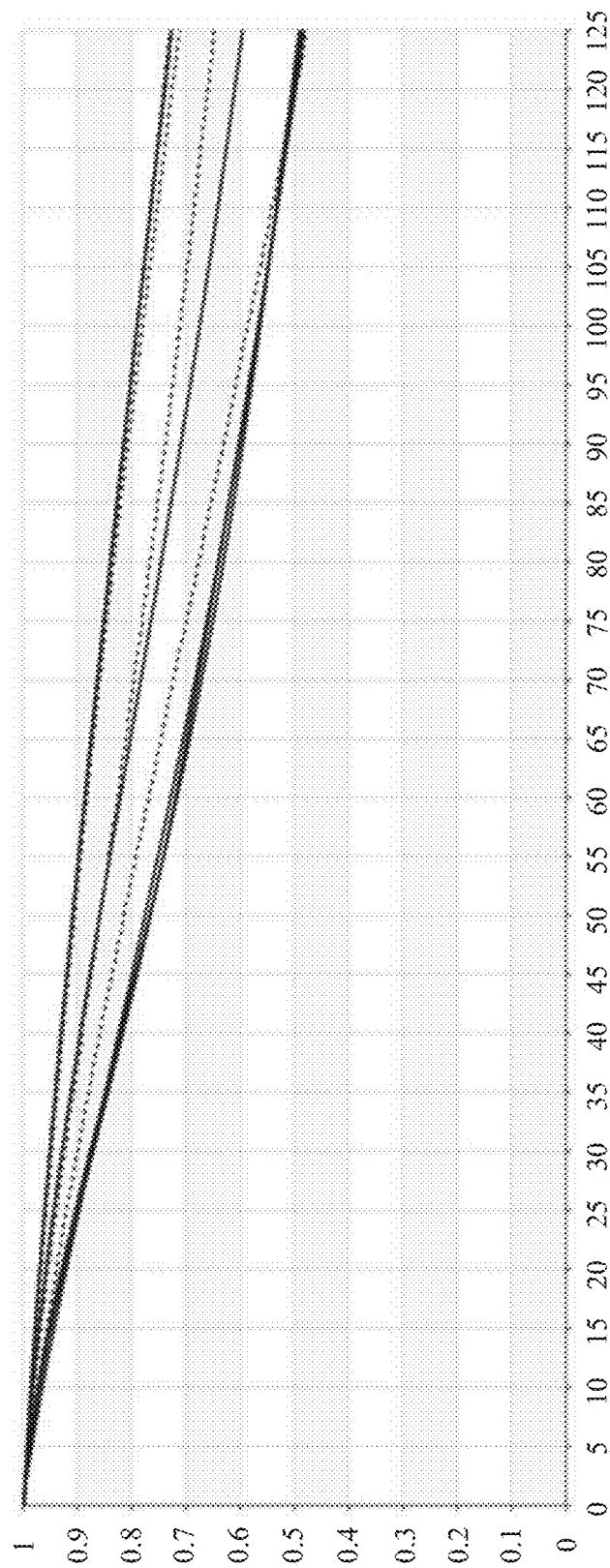
Figure 17:
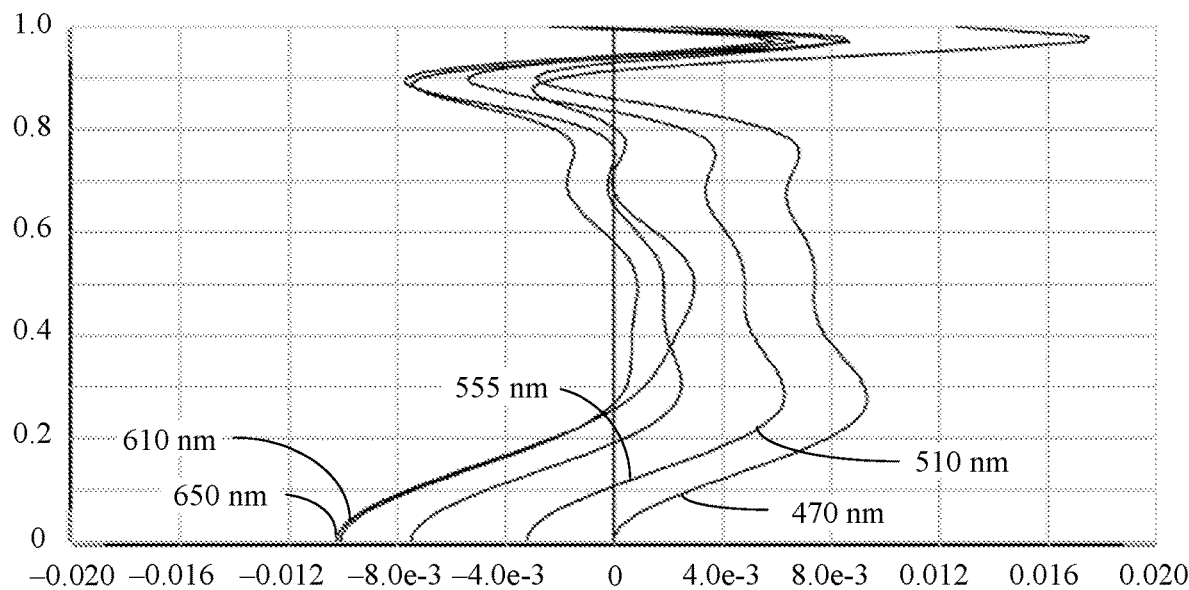
Figure 18:
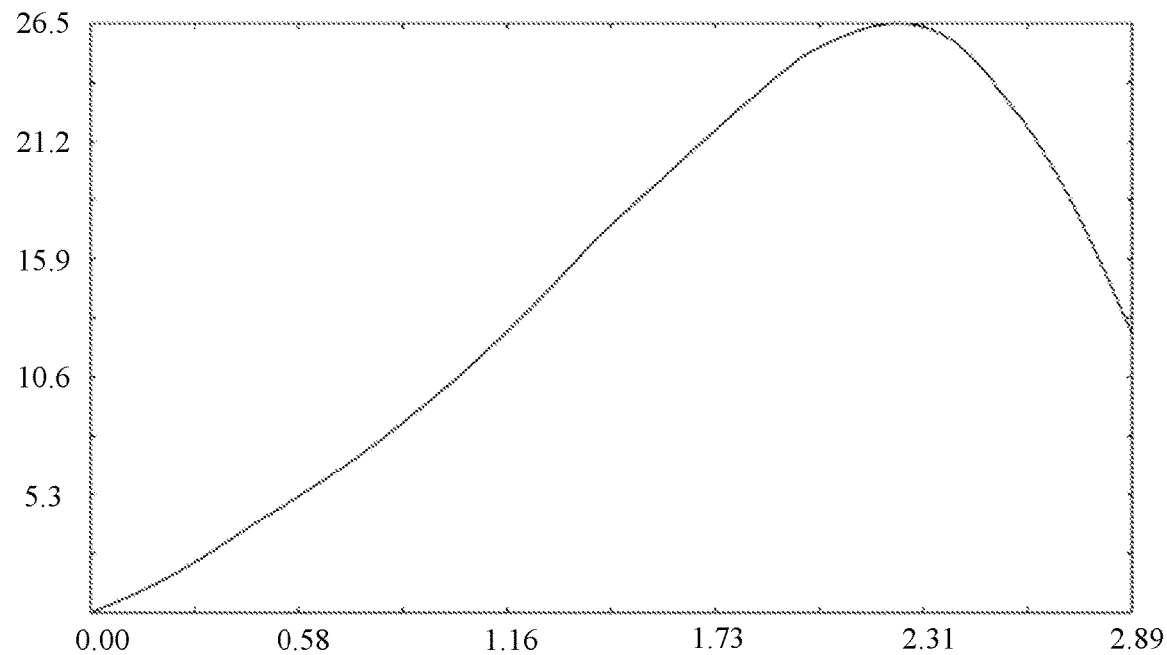
Figure 19A:
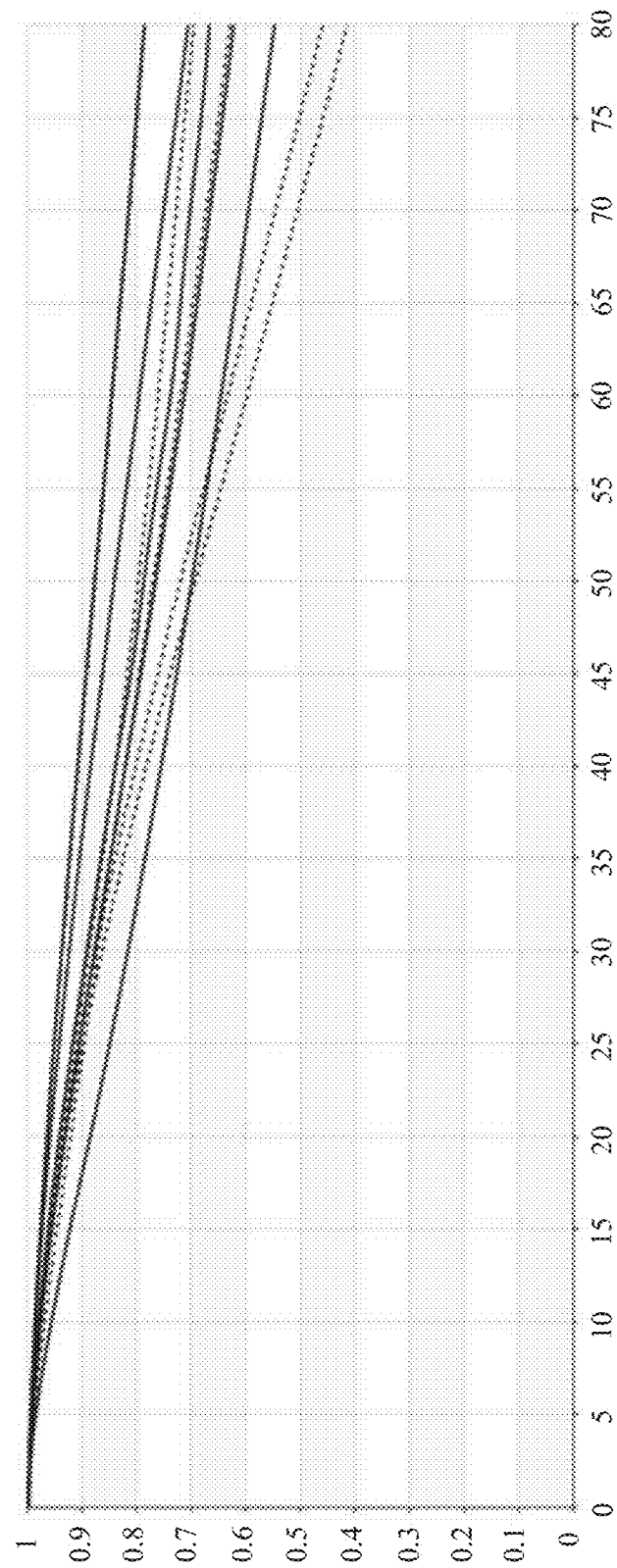
Figure 19B:
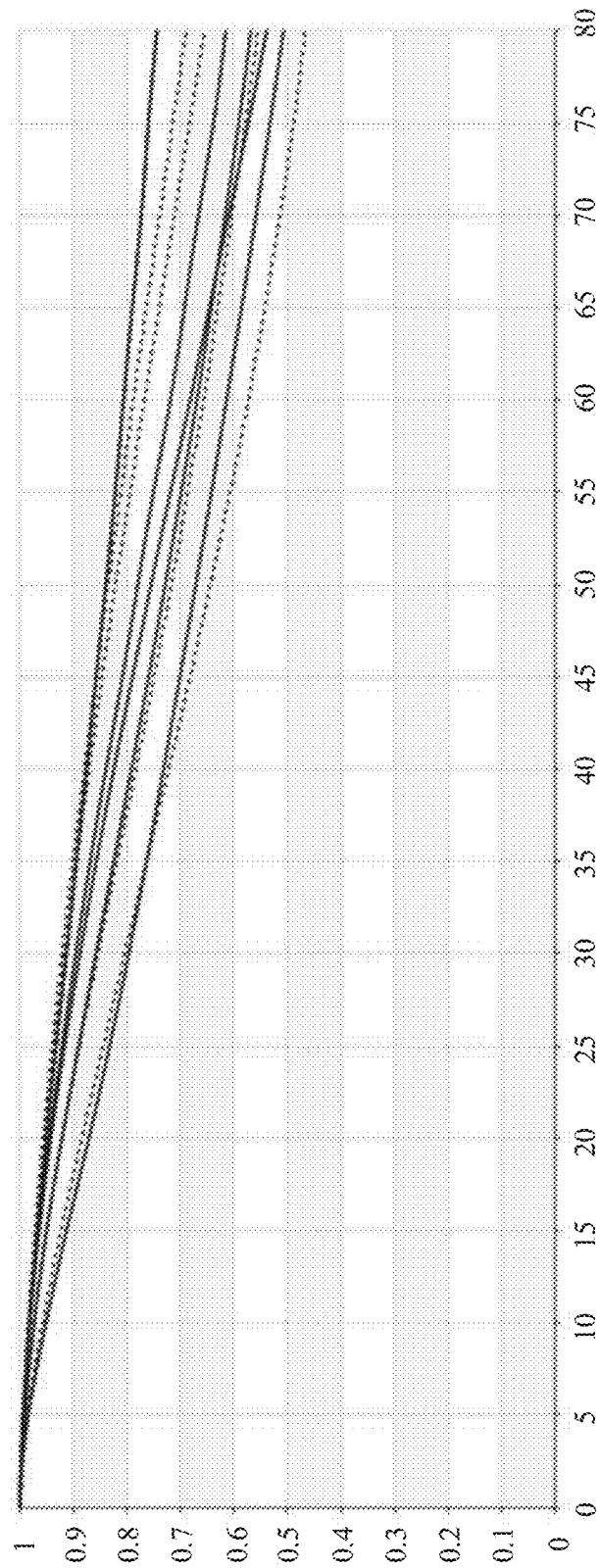
Figure 19C:
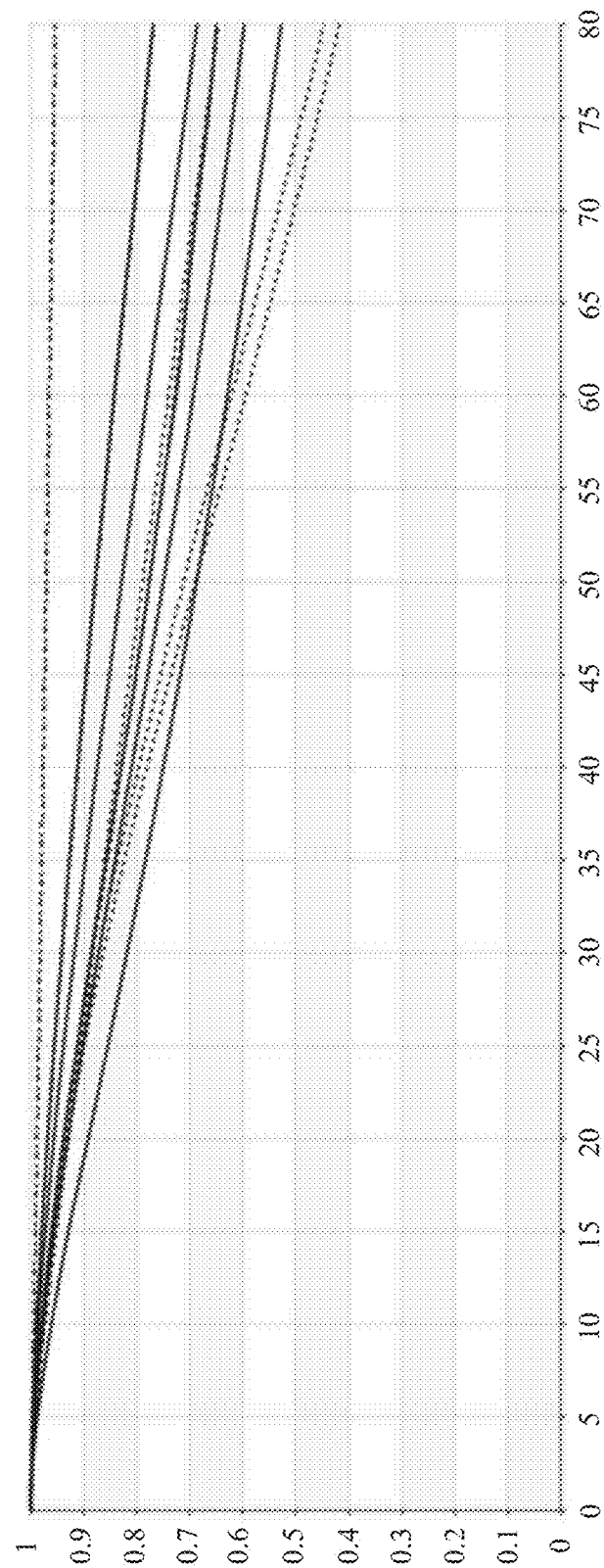

A solid line in FIG. 6 shows a chief ray incident angle curve of the optical lens in the first embodiment;

FIG. 7(a), FIG. 7(b), and FIG. 7(c) show modulation contrast (MTF) curves of the optical lens in the first embodiment at a normal temperature, −30° C., and +70° C., respectively, where the curves are used to indicate deformation differences between imaging of light passing through the optical lens at a high temperature and at a low temperature and imaging of light passing through the optical lens at a normal temperature;

FIG. 8 shows axial aberrations of light with wavelengths of 650 nm, 610 nm, 555 nm, 510 nm, and 470 nm separately after the light passes through an optical lens in a second embodiment;

A solid line in FIG. 9 shows a chief ray incident angle curve of the optical lens in the second embodiment;

FIG. 10(a), FIG. 10(b), and FIG. 10(c) show modulation contrast (MTF) curves of the optical lens in the second embodiment at a normal temperature, −30° C., and +70° C., respectively;

FIG. 11 shows axial aberrations of light with wavelengths of 650 nm, 610 nm, 555 nm, 510 nm, and 470 nm separately after the light passes through an optical lens in a third embodiment;

A solid line in FIG. 12 shows a chief ray incident angle curve of the optical lens in the third embodiment;

FIG. 13(a), FIG. 13(b), and FIG. 13(c) show modulation contrast (MTF) curves of the optical lens in the third embodiment at a normal temperature, −30° C., and +70° C., respectively;

FIG. 14 shows axial aberrations of light with wavelengths of 650 nm, 610 nm, 555 nm, 510 nm, and 470 nm separately after the light passes through an optical lens in a fourth embodiment;

A solid line in FIG. 15 shows a chief ray incident angle curve of the optical lens in the fourth embodiment;

FIG. 16(a), FIG. 16(b), and FIG. 16(c) show modulation contrast (MTF) curves of the optical lens in the fourth embodiment at a normal temperature, −30° C., and +70° C., respectively;

FIG. 17 shows axial aberrations of light with wavelengths of 650 nm, 610 nm, 555 nm, 510 nm, and 470 nm separately after the light passes through an optical lens in a first embodiment;

A solid line in FIG. 18 shows a chief ray incident angle curve of the optical lens in the fifth embodiment; and FIG. 19(a), FIG. 19(b), and FIG. 19(c) show modulation contrast (MTF) curves of the optical lens in the fifth embodiment at a normal temperature, −30° C., and +70° C., respectively.

DESCRIPTION OF EMBODIMENTS

The following describes technical solutions of the embodiments in this application with reference to accompanying drawings.

For ease of understanding, the following first explains and describes technical terms in this application.

An aperture value F# is a relative value (a reciprocal of a relative aperture) obtained by dividing a focal length of a lens by a clear diameter of the lens. A smaller aperture F value corresponds to a larger amount of light admitted in a same unit time. The larger amount of light admitted enables a lens to also perform well in a low-illumination environment.

A positive focal power indicates that a lens has a positive focal length and converges light.

A negative focal power indicates that a lens has a negative focal length and diverges light.

A total track length (TTL) is a total length from a head of a lens barrel to an imaging plane, and is a main factor in forming a height of a camera.

A chief ray is a ray passing through centers of an entrance pupil and an exit pupil of a system.

A chief ray incident angle (CRA) is an incident angle of a chief ray on an image plane.

A warm-up drift indicates an offset between an optimal image plane of a system at a specific temperature and an optimal image plane of the system at a normal temperature. That is, a surface shape, dimensions, and a refractive index that are of a lens change with a temperature.

In an optical instrument, a field of view (FOV) angle uses a lens of the optical instrument as a vertex, and is an included angle formed between two edges of a maximum range that is of the lens and through which an object image of a tested target can pass. A value of the field of view angle determines a field of view range of the optical instrument. A larger field of view angle indicates a larger field of view and a smaller optical magnification.

A modulation contrast (MTF) is an evaluation item of imaging quality of a system.

An optical axis is a ray that vertically passes through a center of an ideal lens. When rays parallel to the optical axis enter an ideal convex lens, all the rays should converge at a point behind the lens. The point at which all the rays converge is a focal point.

Using a lens as a boundary, a side on which a photographed object is located is an object side, and a surface that is of the lens and that is close to the object side may be referred to as an object side surface; and using the lens as the boundary, a side on which an image of the photographed object is located is an image side, and a surface that is of the lens and that is close to the image side may be referred to as an image side surface.

An axial chromatic aberration is also referred to as a longitudinal chromatic aberration, a positional chromatic aberration, or an axial aberration. An aberration that occurs when a beam of rays parallel to an optical axis pass through a lens and converge in different positions is referred to as a positional chromatic aberration or an axial chromatic aberration. This is because the lens forms images in different positions for light of various wavelengths. As a result, focal planes of images of light in different colors cannot overlap at final imaging, and polychromatic light spreads out, resulting in dispersion.

Distortion is a degree of distortion of an image formed by an optical system for an object relative to the object. Distortion results from a stop spherical aberration. A height of a point at which chief rays in different fields of view intersect with a Gaussian image plane after passing through an optical system is not equal to an ideal image height. A difference between the two heights is distortion. Therefore, distortion changes only an imaging position of an off-axis object point on an ideal plane, distorts a shape of an image, but does not affect definition of the image.

Optical distortion is a degree of distortion obtained through optical theoretical calculation.

A spherical aberration is a phenomenon in which rays that are refracted by a lens or reflected by a mirror and that are close to a center or an edge cannot converge an image on a point.

Astigmatism is a phenomenon in which rays propagating in two vertical planes are focused at different focal points, and it is observed that an image produced between the two focal points becomes blurred.

This application provides a terminal. The terminal may be a video camera, a video recorder, a camera, a security camera, a vehicle-mounted camera, or another form of device with a photographing or video shooting function. In some embodiments of this application, an example in which the terminal is a security camera is used for description.

Figure 1:
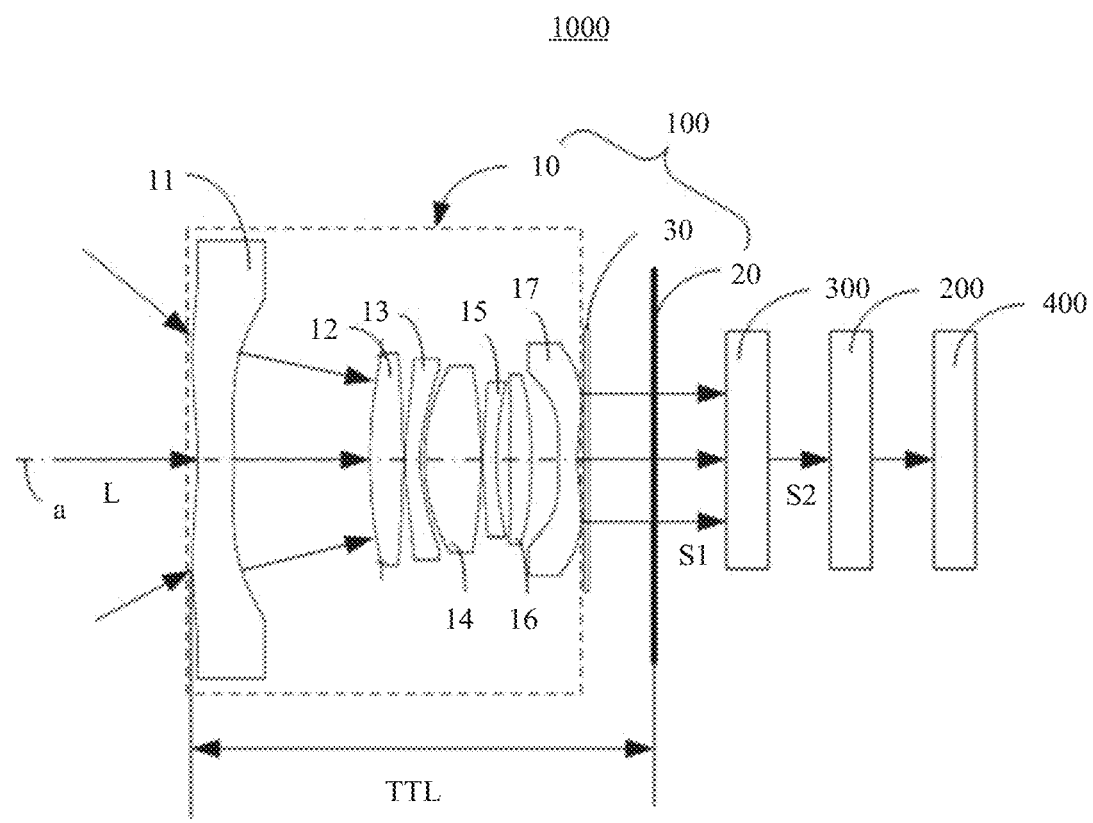
FIG. 1 is a schematic module diagram of a terminal according to an embodiment of this application.

FIG. 1 is a schematic module diagram of a terminal 1000 according to an embodiment of this application. The terminal 1000 includes a camera module 100 and an image processor 200 communicatively connected to the camera module 100. The camera module 100 is configured to: obtain image data and input the image data into the image processor 200, so that the image processor 200 processes the image data. A communication connection between the camera module 100 and the image processor 200 may transmit data in an electrical connection manner such as cabling, or may transmit data in a manner such as coupling. It may be understood that the camera module 100 and the image processor 200 may alternatively implement the communication connection in another manner capable of data transmission.

A function of the image processor 200 is to optimize and process a digital image signal by using a series of complex mathematical algorithm operations, and finally transfer a processed signal to a display. The image processor 200 may be an image processing chip or a digital signal processing (DSP) chip. A function of the DSP chip is to transfer data obtained by a photosensitive chip to a central processing unit in a timely and quick manner, and refresh the photosensitive chip. Therefore, quality of the DSP chip directly affects picture quality (for example, color saturation and definition).

In some embodiments, the terminal 1000 further includes an analog-to-digital converter (A/D converter) 300. The analog-to-digital converter 300 is connected between the camera module 100 and the image processor 200. The analog-to-digital converter 300 is configured to: convert a signal generated by the camera module 100 into a digital image signal, and transmit the digital image signal to the image processor 200. Then, the digital image signal is processed by the image processor 200. Finally, an image is displayed by a display screen or a display.

In some embodiments, the terminal 1000 further includes a memory 400. The memory 400 is communicatively connected to the image processor 200. After processing a digital image signal, the image processor 200 transmits an image to the memory 400, so that the image can be found from the memory at any time and be displayed on a display screen when the image needs to be viewed subsequently. In some embodiments, the image processor 200 further compresses the processed digital image signal, and then stores the compressed digital image signal in the memory 400, to save space in the memory 400.

The camera module 100 includes an optical lens 10 and a photosensitive element 20. The photosensitive element 20 is located on an image side of the optical lens 10. When the camera module 100 is operating, a to-be-imaged scene is imaged on the photosensitive element 20 through the optical lens 10. Specifically, a working principle of the camera module 100 is as follows: After a ray L reflected by a photographed scene passes through the optical lens 10, an optical image is generated and projected to a surface of the photosensitive element 20. The photosensitive element 20 converts the optical image into an electrical signal, that is, an analog image signal S1, and transmits the analog image signal S1 obtained through conversion to the analog-to-digital converter 300, so that the analog-to-digital converter 300 converts the analog image signal S1 into a digital image signal S2 and transmits the digital image signal S2 to the image processor 200.

The photosensitive element 20 is a semiconductor chip. The surface of the photosensitive element 20 includes hundreds of thousands to millions of photodiodes. When light shines on the photodiodes, the photodiodes generate electric charges, which are converted into a digital signal by a chip of the analog-to-digital converter 300. The photosensitive element 20 may be a charge coupled device (CCD), or may be a complementary metal-oxide-semiconductor (CMOS). The charge coupled device CCD is made of a high-light-sensitivity semiconductor material, and can convert light into electric charges, which are converted into a digital signal by the chip of the analog-to-digital converter 300. The CCD includes many photosensitive units, which are usually in a unit of megapixels. When light shines on a surface of the CCD, each photosensitive unit reflects an electric charge to a component. After signals generated by all the photosensitive units are added up, a complete picture is formed. The complementary metal-oxide-semiconductor CMOS is a semiconductor mainly made of two elements of silicon and germanium, so that a semiconductor with an N (with a negative charge) electrode and a semiconductor with a P (with a positive charge) electrode coexist in the CMOS. A current generated by these two complementary effects may be recorded and interpreted into an image by a processing chip.

The optical lens 10 affects imaging quality and an imaging effect. The optical lens 10 includes a plurality of lenses arranged from an object side to an image side, and performs imaging by using a refraction principle of the lenses. That is, a ray reflected by a scene passes through the optical lens 10, and forms a clear image on a focal plane, and the image of the scene is recorded by the photosensitive element 20 located on the focal plane. The object side is a side on which the photographed scene is located, and the image side is a side on which an imaging plane is located. In some embodiments, the optical lens 10 further includes an infrared light filter 30. The infrared light filter 30 is located between the lens and the photosensitive element 20. A ray emergent from the lens shines on the infrared light filter 30, and is transmitted to the photosensitive element 20 through the infrared light filter 30. The infrared light filter 30 can eliminate an unnecessary ray projected on the photosensitive element 20, to prevent the photosensitive element 20 from generating a false color or moire, to improve an effective resolution and color reproduction of the photosensitive element 20.

Figure 2:
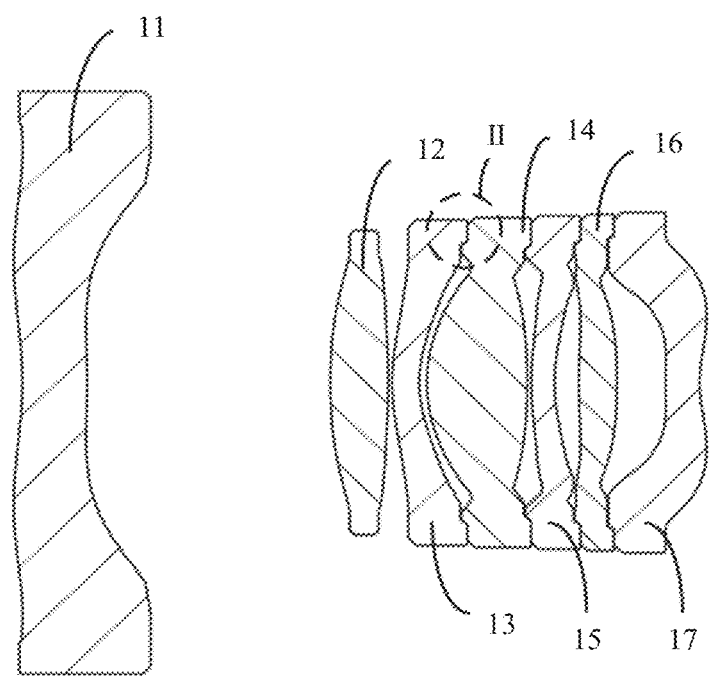
FIG. 2 is a schematic diagram of an axial section of an optical lens in FIG. 1.

Refer to both FIG. 1 and FIG. 2. FIG. 2 is a schematic diagram of an axial section of the optical lens 10 in FIG. 1. The schematic diagram of the axial section is a schematic diagram of a section obtained after a plane passing through an optical axis a of the optical lens 10 cuts off the optical lens 10. In this embodiment, the optical lens 10 includes seven lenses. The seven lenses are separately a first lens 11, a second lens 12, a third lens 13, a fourth lens 14, a fifth lens 15, a sixth lens 16, and a seventh lens 17 from the object side to the image side. The lenses are disposed coaxially. It should be noted that in an actual case, optical axes of the lenses may be slightly staggered due to assembly or a lens manufacturing process, and in this case, the lenses may also be considered as coaxially disposed. Each lens includes an object side surface facing the object side and an image side surface facing the image side. It may be understood that each lens in this embodiment of this application is a lens with a positive focal power or a negative focal power. When a flat mirror is inserted between a plurality of lenses, the flat mirror is not considered as a lens of the optical lens in this application. For example, when a flat mirror is inserted between the fourth lens 14 and the fifth lens 15, the flat mirror cannot be considered as the fifth lens in this embodiment of this application.

In this embodiment, the first lens 11 has a negative focal power, an object side surface of the first lens 11 is concave in a paraxial position, and an image side surface of the first lens 11 is convex in a paraxial position. The second lens 12 has a positive focal power. The third lens 13 has a negative focal power. The fourth lens 14 has a positive focal power. The fifth lens 15 has a negative focal power. The sixth lens 16 and the seventh lens 17 each have a focal power. That is, the sixth lens 16 and the seventh lens 17 may be set as a lens with a positive focal power or a lens with a negative focal power according to an actual requirement, and are not a flat lens. An object side surface of the seventh lens 17 is convex in a paraxial position, and an image side surface of the seventh lens 17 is concave in a paraxial position. In this embodiment, the first lens 11 to the seventh lens 17 are disposed according to the foregoing structure, so that an F# value of the optical lens 10 can meet: F#≥0.7. That is, the F# value of the optical lens 10 may be set to a value such as 0.8, 0.9, 1.0, 1.1, 1.2, 1.3, or 1.4 according to a requirement. Compared with a common optical lens 10, the optical lens 10 in this embodiment of this application can have a quite small F# value, so that a large aperture can be implemented for the optical lens 10, the optical lens 10 in this embodiment of this application can also be used in a low-illumination environment, and when the optical lens 10 is applied to a terminal such as a vehicle-mounted camera or a security camera, the optical lens 10 can also achieve a good imaging effect in a low-illumination environment.

Figure 3:
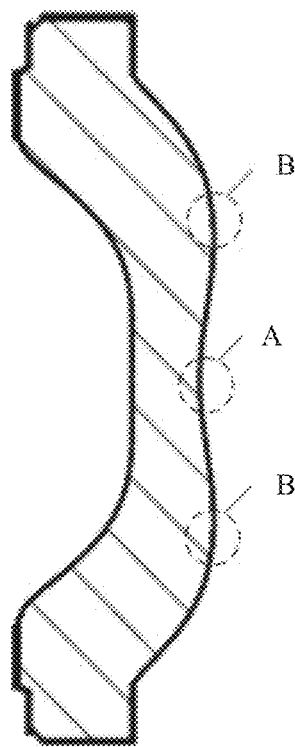
FIG. 3 is a schematic diagram of an axial section of a seventh lens in the optical lens in an embodiment shown in FIG. 2.

In some embodiments of this application, the lens closest to the image side in the plurality of lenses of the optical lens 10 is an M-shaped lens. In the embodiment shown in FIG. 2, the seventh lens 17 is the M-shaped lens. In this embodiment of this application, for an M-shaped lens, there are two inflection points for a change in a surface inclination angle of an object side surface or an image side surface of the lens except for a vertex in a paraxial position. To be specific, a center area and an edge area that are of the lens are convex toward the object side surface (or the image side surface), and an area between the center area and the edge area is convex toward the image side surface (or the object side surface). FIG. 3 is a schematic diagram of an axial section of the seventh lens 17 in the optical lens 10 in the embodiment shown in FIG. 2. In the optical lens 10 in the embodiment shown in FIG. 2, the seventh lens 17 is the M-shaped lens. A center area and an edge area that are of the lens are convex toward the object side surface, and an area between the center area and the edge area is convex toward the image side surface. That is, there are two inflection points B for a change in a surface inclination angle of the object side surface or the image side surface of the lens except for a vertex A in a paraxial position.

In this embodiment, the lens closest to the image side surface in the optical lens 10 is an M-shaped lens. This can effectively increase a chief ray incident angle of the optical lens 10, so that the optical lens 10 can match the photosensitive element 20 with a large chief ray incident angle, thereby implementing a good imaging effect. In some embodiments of this application, a maximum chief ray incident angle (CRA) of the optical lens 10 can meet: CRA≥20°.

In this embodiment of this application, the plurality of lenses in the optical lens 10 include at least one glass lens and at least one plastic lens. In other words, the glass lens and the plastic lens are used together. Compared with a common optical lens 10 using a glass lens, the optical lens 10 in this embodiment of this application can have lower costs, because the plastic lens has lower costs than the glass lens. In addition, a manner of using the glass lens and the plastic lens together can correct a warm-up drift of the optical lens 10, thereby reducing a warm-up drift of the optical lens 10 in a use environment at any temperature, and implementing a good optical imaging effect. Specifically, a refractive index of the glass lens changes with a temperature, and a relationship between the refractive index of the glass lens and the temperature meet: dn/dT>0; and a refractive index of the plastic lens changes with a temperature, and a relationship between the refractive index of the plastic lens and the temperature meet: dn/dT<0, where do represents a change value of a refractive index per unit time, and dT represents a change value of a temperature per unit time. When the temperature rises, the refractive index of the glass lens increases correspondingly, and the refractive index of the plastic lens decreases correspondingly. In this way, the warm-up drift of the optical lens 10 can be corrected by using the glass lens and the plastic lens together. In some embodiments of this application, the second lens 12 is a glass lens, and the other lenses are plastic lenses. It may be understood that in some embodiments, lenses other than the second lens 12 may alternatively be glass lenses. In this embodiment of this application, there may be one or more glass lenses, and a quantity of glass lenses is not specifically limited herein.

In this embodiment of this application, a refractive index n1 of the glass lens meets: 1.4≤nd≤2.1. Compared with the plastic lens whose refractive index range is 1.55 to 1.65, the glass lens allows a wider refractive index range for selection. Therefore, it is easier to obtain a thinner glass lens with better performance. This helps reduce a total track length TTL of the optical lens 10, so that an electronic device to which the optical lens 10 is applied can have a comparatively small thickness. In this embodiment of this application, considering manufacturing costs, efficiency, and an optical effect, specific application materials of different lenses are appropriately matched according to a requirement.

Figure 4:
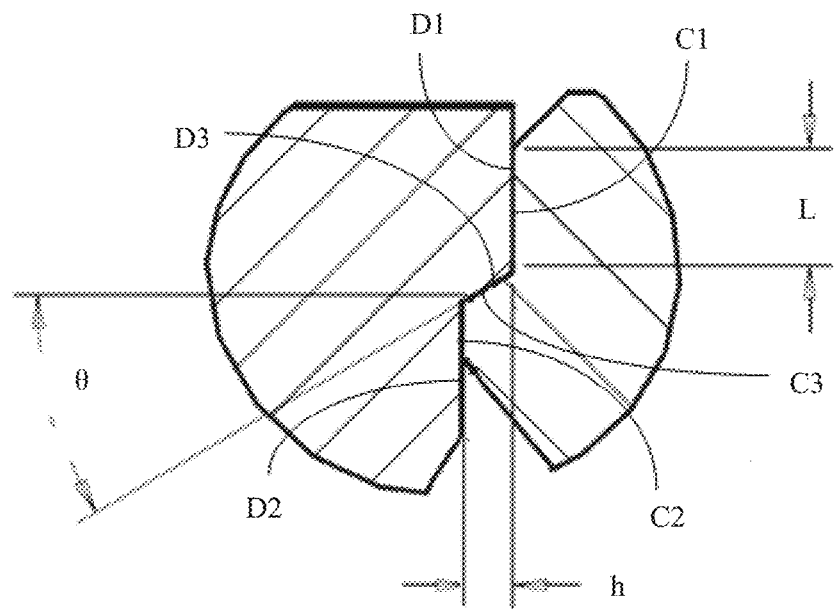
FIG. 4 is a schematic diagram of an enlarged position II in the optical lens shown in FIG. 2.

FIG. 4 is a schematic diagram of an enlarged position II in the optical lens shown in FIG. 2. In some embodiments of this application, a first step structure is disposed around an edge of an object side surface or image side surface of at least one of the lenses, that is, the first step structure is disposed around the edge of the lens. The first step structure includes a first area C1, a second area C2, and a third area C3 connected between the first area C1 and the second area C2. In this embodiment, all of the first area C1, the second area C2, and the third area C3 are in a shape of concentric rings, and the first area C1 is closer to the edge of the lens relative to the second area C2. A distance from a reference plane to a position in which the first area C1 and the third area C3 are connected is different from a distance from the reference plane to a position in which the second area C2 and the third area C3 are connected. In this embodiment, both the first area C1 and the second area C2 are perpendicular to the optical axis a of the optical lens, and a distance from the first area C1 of the lens to the reference plane is different from a distance from the second area C2 of the lens to the reference plane. The reference plane is a plane perpendicular to the optical axis of the lens. The third area C3 forms an included angle with the optical axis of the optical lens. In some embodiments of this application, the third area C3 forms an included angle θ with the optical axis a of the lens at which the third area C3 is located, and a range of the included angle θ meets the following condition: 0°<θ<45°, thereby implementing that the first area C1 and the fourth area D1 can fit more tightly together, and the third area C3 and the sixth area D3 can fit more tightly together when the adjacent lenses are mounted.

A second step structure is disposed around an edge of the lens adjacent to the lens provided with the first step structure, that is, the second step structure is disposed around the edge of the lens. The second step structure includes a fourth area D1, a fifth area D2, and a sixth area D3 connected between the fourth area D1 and the fifth area D2. In this embodiment, all of the fourth area D1, the fifth area D2, and the sixth area D3 are in a shape of concentric rings, and the fourth area D1 is closer to the edge of the lens relative to the fifth area D2. A distance from the reference plane to a position in which the fourth area D1 and the sixth area D3 are connected is different from a distance from the reference plane to a position in which the fifth area D2 and the sixth area D3 are connected. In this embodiment, both the fourth area D1 and the fifth area D2 are perpendicular to the optical axis a of the optical lens, and a distance from the fourth area D1 of the lens to the reference plane is different from a distance from the fifth area D2 of the lens to the reference plane. The reference plane is a plane perpendicular to the optical axis a of the lens. In this embodiment of this application, the first step structure of the lens and the second step structure of the another lens adjacent to the lens fit into each other. To be specific, the first area C1 of the first step structure of the lens and the fourth area D1 of the second step structure of the another lens adjacent to the lens fit tightly together, and the third area C3 of the first step structure of the lens and the sixth area D3 of the second step structure of the another lens adjacent to the lens fit tightly together.

In this embodiment of this application, the third lens 13 to the seventh lens 17 are plastic lenses. Each of object side surfaces of the fourth lens 14 to the seventh lens 17 is provided with the first step structure, and each of image side surfaces of the third lens 13 to the sixth lens 16 is provided with the second step structure. The first step structure of any one of the fourth lens 14 to the seventh lens 17 and the second step structure of the another lens adjacent to the lens fit into each other. FIG. 4 is a schematic diagram of an enlarged position in which the second step structure of the fourth lens 14 and the first step structure of the third lens 13 are in contact.

In this embodiment, the adjacent lenses are separately provided with the first step structure and the second step structure, at least a part of the first area C1 of the first step structure and at least a part of the fourth area D1 of the second step structure are enabled to fit tightly together, and at least a part of the third area C3 of the first step structure and at least a part of the sixth area D3 of the second step structure are enabled to fit tightly together. That is, the first step structure and the second step structure fit into each other, thereby avoiding relative movement of the adjacent lenses in the axial direction, and enabling a more stable positional relationship between the lens and the lens adjacent to the lens. In addition, a distance between the adjacent lenses can be adjusted by adjusting a difference h' between the distance from the fourth area D1 to the reference plane and the distance from the fifth area D2 to the reference plane. For example, when a position of the first area C1 of the fourth lens 14 and a position of the fifth area D2 of the third lens 13 are kept unchanged, and the difference h' between the distance from the fourth area D1 to the reference plane and the distance from the fifth area D2 to the reference plane is increased, the distance between the third lens 13 and the fourth lens 14 changes when the second step structure of the third lens 13 and the first step structure of the fourth lens 14 are in contact. In this embodiment, a difference h between the distance from the reference plane to the position in which the first area C1 and the third area C3 are connected and the distance from the reference plane to the position in which the second area C2 and the third area C3 are connected meets the following condition: 0.08 mm≤h≤0.4 mm. The difference h' between the distance from the reference plane to the position in which the fourth area D1 and the sixth area D3 are connected and the distance from the reference plane to the position in which the fifth area D2 and the sixth area D3 are connected is greater than h. Therefore, it is ensured that the adjacent lenses fit tightly together only in the first area C1 and the fourth area D1, and there is a gap between the second area C2 and the fifth area D2. In addition, it is ensured that a distance in the axial direction is within an appropriate tolerance range.

In this embodiment, a length L of a contact area between the first area C1 and the fourth area D1 in a radial direction meets the following condition: 0.2 mm≤L≤0.8 mm. In addition, the third area C3 and the sixth area D3 fit tightly together, thereby enabling more stable contact between the first step structure and the second step structure, and ensuring a more stable positional relationship between the lens and the lens adjacent to the lens. The radial direction in this embodiment is a direction perpendicular to the axial direction a of the lens.

In this embodiment of this application, the optical lens 10 includes the plurality of different lenses. Different lens combinations (for example, based on an order in which the lenses are arranged along an optical path, a lens material, a refractive index, or shape curvature) bring different optical performance. In some embodiments of this application, when the first lens 11 is a lens with a negative focal power, and the second lens 12 is a lens with a positive focal power, the first lens 11 and the second lens 12 work together to well converge rays from a large field of view into the optical lens 10, thereby implementing design of a large field-of-view angle and a large image height for the optical lens 10, and obtaining the optical lens 10 with a large quantity of pixels and a large field of view. In some embodiments of this application, the image height IH of the optical lens 10 can meet: IH≥9.2 mm, and therefore, may match the photosensitive element 20 with a large target surface and a large quantity of pixels, thereby obtaining the optical lens 10 with a large quantity of pixels. In some embodiments, a largest field of view FOV angle of the optical lens 10 can meet: FOV≥90°, thereby obtaining the optical lens with a large field of view.

In the optical lens 10 in the present disclosure, the third lens 13 to the seventh lens 17 complement each other, and can correct aberrations of a large-aperture lens such as a spherical aberration, astigmatism, and distortion, thereby improving image quality of the lens.

Specifically, in some embodiments of this application, the first lens 11 has a positive focal power, and a main function of the first lens 11 is light converging. The object side surface of the first lens 11 is convex in the paraxial position, and the image side surface of the first lens 11 is convex or concave in the paraxial position. The first lens 11 meets the following relational expression: R1/R2≥0.2, where R1 is a curvature radius of the object side surface of the first lens 11, and R2 is a curvature radius of the image side surface of the first lens 11.

In the foregoing relational expression, a range of a ratio of the curvature radius of the object side surface of the first lens 11 to the curvature radius of the image side surface of the first lens 11 is specified, indicating a light-converging capability of the first lens 11, thereby helping reduce a coma and an axial chromatic aberration that are of a system. In addition, the ratio of the curvature radius of the object side surface of the first lens 11 to the curvature radius of the image side surface of the first lens 11 indicates degrees of concavity and convexity of the image side surface and the object side surface of the first lens 11, thereby helping reduce the total track length TTL of the optical lens, and obtaining the thinner terminal 1000.

The second lens 12 has a positive focal power, and meets the following relational expression: f2/f≥1.0, where f2 is a focal length of the second lens 12, and f is a focal length of the optical lens 10.

In the foregoing relational expression, a range of a ratio of the focal length of the second lens 12 to the focal length of the optical lens 10 is specified, thereby helping correct dispersion or a spherical aberration of the system.

The fourth lens 14 has a positive focal power, and meets the following relational expression: f4/f≤1.5, where f4 is a focal length of the fourth lens 14, and f is the focal length of the optical lens 10.

It should be noted that being convex or concave in a paraxial position means that being convex or concave in a position infinitely close to an optical axis of a lens, that is, the paraxial position is the position infinitely close to the optical axis. It should be noted that a shape of a lens and degrees of concavity and convexity of an object side surface and an image side surface are merely examples, and do not impose any limitation on the embodiments of this application. Concavity and convexity of a part that is of an object side surface or an image side surface and that is far from an optical axis are not limited in the embodiments of this application.

In some embodiments of this application, the total track length TTL, an aperture value F#, and the image height IH that are of the optical lens 10 are appropriately configured by using different lens combinations, so that the total length TTL, F#, and the image height IH meet: F#²×TTL/IH≥2.0, thereby further providing a lens with a small total length (TTL) under a premise of meeting requirements of a large aperture and a large quantity of pixels.

In some embodiments of this application, most of the lenses are aspheric lenses. That is, both the image side surface and the object side surface of each lens are aspheric. Curvature of the object side surface of each lens and curvature of the image side surface of each lens change continuously from a center of the lens to a periphery of the lens. Therefore, the lenses have a better curvature radius characteristic, and have an advantage of eliminating an aberration. In this embodiment of this application, the aspheric lenses are used, so that an aberration occurring during imaging can be eliminated as much as possible, thereby improving imaging quality.

In some embodiments of this application, the image side surface and the object side surface of each lens meet the following formula:

$$y = \frac{cr^2}{1+\sqrt{1-(1+K)c^2r^2}} + a_4r^4 + a_6r^6 + a_8r^8 + a_{10}r^{10} + a_{12}r^{12}a_{14}r^{14} + a_{16}r^{16} + a_{18}r^{18} + a_{20}r^{20},$$

where
y is a vector height of an aspheric surface, r is a radial coordinate of the aspheric surface, c is spherical curvature of a vertex of the aspheric surface, K is a constant of a quadric surface, and $a_4$, $a_6$, $a_8$, $a_{10}$, $a_{12}$, $a_{14}$, $a_{16}$, $a_{18}$, and an are aspheric coefficients.

Lenses with different aspheric surfaces can be obtained by using the foregoing relational expression, so that different lenses can implement different optical effects, thereby implementing a good photographing effect through cooperation between the different aspheric lenses.

The following describes in more detail some specific but non-limiting examples of the embodiments of this application with reference to FIG. 2 and FIG. 5 to FIG. 19(c).

Refer to FIG. 2 again. FIG. 2 is a schematic diagram of an axial section of an optical lens 10 according to a first embodiment of this application. In this embodiment, a first lens 11, a second lens 12, a third lens 13, a fourth lens 14, a fifth lens 15, a sixth lens 16, and a seventh lens 17 are sequentially disposed from an object side to an image side, and the lenses are disposed coaxially. In this embodiment, a stop is disposed between the first lens 11 and the second lens 12.

The first lens 11 has a negative focal power, an object side surface of the first lens 11 is concave in a paraxial position, and an image side surface of the first lens 11 is convex in a paraxial position. The second lens 12 has a positive focal power, an object side surface of the second lens 12 is convex in a paraxial position, and an image side surface of the second lens 12 is convex in a paraxial position. The third lens 13 has a negative focal power, an object side surface of the third lens 13 is convex in a paraxial position, and an image side surface of the third lens 13 is concave in a paraxial position. The fourth lens 14 has a positive focal power, an object side surface of the fourth lens 14 is convex in a paraxial position, and an image side surface of the fourth lens 14 is convex in a paraxial position. The fifth lens 15 has a negative focal power, an object side surface of the fifth lens 15 is convex in a paraxial position, and an image side surface of the fifth lens 15 is concave in a paraxial position. The sixth lens 16 has a positive focal power, an object side surface of the sixth lens 16 is convex in a paraxial position, and an image side surface of the sixth lens 16 is convex in a paraxial position. The seventh lens 17 has a negative focal power, an object side surface of the seventh lens 17 is convex in a paraxial position, and an image side surface of the seventh lens 17 is concave in a paraxial position.

In this embodiment, the second lens 12 is of glass material, and a first lens 12, the third lens 13, the fourth lens 14, the fifth lens 15, the sixth lens 16, and the seventh lens 17 are all of plastic material.

According to the foregoing relational expressions, design parameters and results in the first embodiment of this application are shown in Table 1.

TABLE 1

| Design parameters of the optical lens 10 in the first embodiment | |
|---|---|
| Focal length f | 5.86 mm |
| Aperture value F# | 1.1 |
| Half FOV | 45° |
| Effective image height IH | 9.2 mm |
| Total optical length TTL | 19.0 mm |
| Maximum chief ray incident angle (CRA) | 36° |
| Effective image height IH | 9.2 mm |
| Design wavelength | 650 nm, 610 nm, 555 nm, 510 nm, 470 nm |
| Refractive index nd of glass material in light d (with a wavelength of 587.6 nm) | 1.77 |
| $R_1/R_2$ | 0.405 |
| $f_4/f$ | 1.09 |
| $f_2/f$ | 1.80 |
| $F\#^2 \times TTL/IH$ | 2.5 |

In Table 1, f represents a focal length of the optical lens 10, f2 represents a focal length of the second lens 12, f4 represents a focal length of the fourth lens 14, R1 represents a curvature radius of the object side surface of the first lens 11, R2 represents a curvature radius of the image side surface of the first lens 11, F# represents an aperture of the optical lens 10, TTL represents a total track length of the optical lens 10, and IH represents a maximum image plane height of the optical lens 10. It should be noted that meanings of symbols such as f, f2, f4, R1, R2, F#, TTL, and IH are all the same in this application, and details are not described again when they occur hereinafter.

Table 2 shows a curvature radius R, a center thickness, a refractive index (nd), and an Abbe number (vd) that are of each constituent lens of an optical lens 100 in the first embodiment of this application, as shown in Table 2.

TABLE 2

Curvature radius, thickness, refractive index, and Abbe number that are of each lens of the optical lens in the first embodiment

|   | R | | Thickness | | nd | | vd |
|---|---|---|---|---|---|---|---|
| R1 | −1.01E+01 | d1 | 1.70E+00 | n1 | 1.54 | v1 | 56.0 |
| R2 | −2.49E+01 | a1 | 6.88E+00 | | | | |
| Stop | Infinity | / | −4.94E−01 | / | / | / | / |
| R3 | 1.61E+01 | d2 | 1.52E+00 | n2 | 1.77 | v2 | 46.9 |
| R4 | −1.61E+01 | a2 | 1.00E−01 | | | | |
| R5 | 6.01E+00 | d3 | 7.13E−01 | n3 | 1.66 | v3 | 20.4 |
| R6 | 3.52E+00 | a3 | 2.01E−01 | | | | |
| R7 | 4.55E+00 | d4 | 2.64E+00 | n4 | 1.54 | v4 | 56.0 |
| R8 | −1.20E+01 | a4 | 1.00E−01 | | | | |
| R9 | 8.50E+00 | d5 | 6.11E−01 | n5 | 1.66 | v5 | 20.4 |
| R10 | 5.14E+00 | a5 | 6.36E−01 | | | | |
| R11 | 1.84E+01 | d6 | 1.00E+00 | n6 | 1.54 | v6 | 56.0 |
| R12 | −1.87E+01 | a6 | 1.28E+00 | | | | |
| R13 | 1.21E+01 | d7 | 8.91E−01 | n7 | 1.64 | v7 | 23.5 |
| R14 | 3.44E+00 | a7 | 3.05E−01 | | | | |

Meanings of symbols in the table are as follows:
stop: aperture;
Inf.: infinity;
R: a curvature radius of an optical surface. Positive or negative indicates that the optical surface is convex toward an object side or an image side, respectively. Positive indicates that the optical surface is convex toward an object side surface in a position near an optical axis, and negative indicates that the optical surface is convex toward an image side surface in a position near an optical axis;
R1: the curvature radius of the object side surface of the first lens 11;
R2: the curvature radius of the image side surface of the first lens 11;
R3: a curvature radius of the object side surface of the second lens 12;
R4: a curvature radius of the image side surface of the second lens 12;
R5: a curvature radius of the object side surface of the third lens 13;
R6: a curvature radius of the image side surface of the third lens 13;
R7: a curvature radius of the object side surface of the fourth lens 14;
R8: a curvature radius of the image side surface of the fourth lens 14;
R9: a curvature radius of the object side surface of the fifth lens 15;
R10: a curvature radius of the image side surface of the fifth lens 15;
R11: a curvature radius of the object side surface of the sixth lens 16;
R12: a curvature radius of the image side surface of the sixth lens 16;
R13: a curvature radius of the object side surface of the seventh lens 17;
R14: a curvature radius of the image side surface of the seventh lens 17;
T: an on-axial thickness of a lens or an on-axial distance between lenses;
d1: an on-axial thickness of the first lens 11;
a1: an on-axial distance between the image side surface of the first lens 11 and the object side surface of the second lens 12;
d2: an on-axial thickness of the second lens 12;
a2: an on-axial distance between the image side surface of the second lens 12 and the object side surface of the third lens 13;
d3: an on-axial thickness of the third lens 13;
a3: an on-axial distance between the image side surface of the third lens 13 and the object side surface of the fourth lens 14;
d4: an on-axial thickness of the fourth lens 14;
a4: an on-axial distance between the image side surface of the fourth lens 14 and the object side surface of the fifth lens 15;
d5: an on-axial thickness of the fifth lens 15;
a5: an on-axial distance between the image side surface of the fifth lens 15 and the object side surface of the sixth lens 16;
d6: an on-axial thickness of the sixth lens 16;
a6: an on-axial distance between the image side surface of the sixth lens 16 and the object side surface of the seventh lens 17;
d7: an on-axial thickness of the seventh lens 17;
a7: an on-axial distance between the image side surface of the seventh lens 17 and an object side surface of a light filter 19;
nd: a refractive index of a lens;
n1: a refractive index of the first lens 11;
n2: a refractive index of the second lens 12;
n3: a refractive index of the third lens 13;
n4: a refractive index of the fourth lens 14;
n5: a refractive index of the fifth lens 15;
n6: a refractive index of the sixth lens 16;
n7: a refractive index of the seventh lens 17;
vd: an Abbe number;
v1: an Abbe number of the first lens 11;
v2: an Abbe number of the second lens 12;
v3: an Abbe number of the third lens 13;
v4: an Abbe number of the fourth lens 14;
v5: an Abbe number of the fifth lens 15;
v6: an Abbe number of the sixth lens 16; and
v7: an Abbe number of the seventh lens 17.

It should be noted that the following uses −1.01E+01 as an example to describe a meaning of a value used to indicate the radius R in Table 2. In the formula, E+01 represents 10 to the power of 1. Therefore, a value of −1.01E+01 is −10.1. Table 3 shows aspheric coefficients of the optical lens 100 in the first embodiment of this application, as shown in Table 3.

TABLE 3

Aspheric coefficients of each lens of the optical lens in the first embodiment

| | Aspheric coefficients | | | | | | | | | |
|---|---|---|---|---|---|---|---|---|---|---|
| | k | A4 | A6 | A8 | A10 | A12 | A14 | A16 | A18 | A20 |
| R1 | −4.99E+00 | 3.42E−03 | −1.54E−04 | 6.12E−06 | −2.11E−07 | 5.17E−09 | −8.46E−11 | 8.72E−13 | −4.74E−15 | 7.51E−18 |
| R2 | −1.52E+01 | 4.27E−03 | −8.68E−05 | −9.25E−07 | 4.70E−07 | −4.58E−08 | 2.38E−09 | −7.55E−11 | 1.40E−12 | −1.15E−14 |
| Stop | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| R3 | −3.67E+01 | 3.70E−03 | −2.97E−04 | 5.98E−06 | 4.25E−06 | −9.86E−07 | 1.13E−07 | −7.97E−09 | 3.32E−10 | −6.40E−12 |
| R4 | −2.25E+00 | 7.31E−03 | −2.34E−03 | 5.99E−04 | −1.13E−04 | 1.49E−05 | −1.35E−06 | 8.04E−08 | −2.83E−09 | 4.41E−11 |
| R5 | −2.77E+00 | −4.22E−03 | −5.72E−04 | 3.76E−06 | 8.73E−05 | −2.69E−05 | 3.93E−06 | −3.15E−07 | 1.34E−08 | −2.36E−10 |
| R6 | −2.27E−01 | −1.34E−02 | 3.32E−03 | −2.17E−03 | 8.41E−04 | −1.90E−04 | 2.60E−05 | −2.14E−06 | 9.71E−08 | −1.88E−09 |
| R7 | −5.54E−01 | 3.48E−03 | 1.11E−03 | −1.65E−03 | 7.01E−04 | −1.64E−04 | 2.36E−05 | −2.07E−06 | 1.02E−07 | −2.19E−09 |
| R8 | −1.34E+00 | 5.04E−03 | −9.78E−04 | −1.00E−03 | 6.25E−04 | −1.71E−04 | 2.67E−05 | −2.47E−06 | 1.25E−07 | −2.66E−09 |
| R9 | −7.13E−01 | −5.34E−03 | 1.90E−03 | −2.17E−03 | 8.71E−04 | −1.69E−04 | 1.67E−05 | −5.04E−07 | −4.37E−08 | 3.00E−09 |
| R10 | −2.62E+00 | −1.02E−02 | 4.67E−03 | −2.60E−03 | 8.59E−04 | −1.75E−04 | 2.49E−05 | −2.52E−06 | 1.65E−07 | −5.24E−09 |
| R11 | −5.00E+01 | −6.27E−03 | 2.79E−03 | −1.18E−03 | 3.08E−04 | −7.36E−05 | 1.48E−05 | −1.92E−06 | 1.37E−07 | −4.07E−09 |
| R12 | −5.38E+00 | −1.12E−02 | 3.59E−03 | −1.11E−03 | 2.80E−04 | −6.03E−05 | 9.56E−06 | −9.21E−07 | 4.38E−08 | −5.74E−10 |
| R13 | −3.67E+01 | −4.89E−02 | 7.78E−03 | −2.49E−03 | 9.21E−04 | −2.48E−04 | 4.34E−05 | −4.65E−06 | 2.79E−07 | −7.10E−09 |
| R14 | −3.02E−01 | −4.64E−02 | 8.65E−03 | −1.61E−03 | 2.35E−04 | −2.64E−05 | 2.10E−06 | −1.10E−07 | 3.41E−09 | −4.70E−11 |

In Table 3, k is a conic coefficient, and A4, A6, A8, A10, A12, A14, A16, and A20 are aspheric coefficients. In this embodiment, the provided aperture value F# of the optical lens 10 is 1.1, and the maximum chief ray incident angle is 36°. Compared with a common optical lens 10, the aperture value F# of the optical lens 10 is smaller. The maximum chief ray incident angle is 36°, so that the optical lens 10 can perform comparatively well in low illumination and can match a photosensitive element 20 with a large chief ray incident angle.

FIG. 5 to FIG. 7(c) are optical performance characterization diagrams of the optical lens 10 in the first embodiment.

Figure 5:
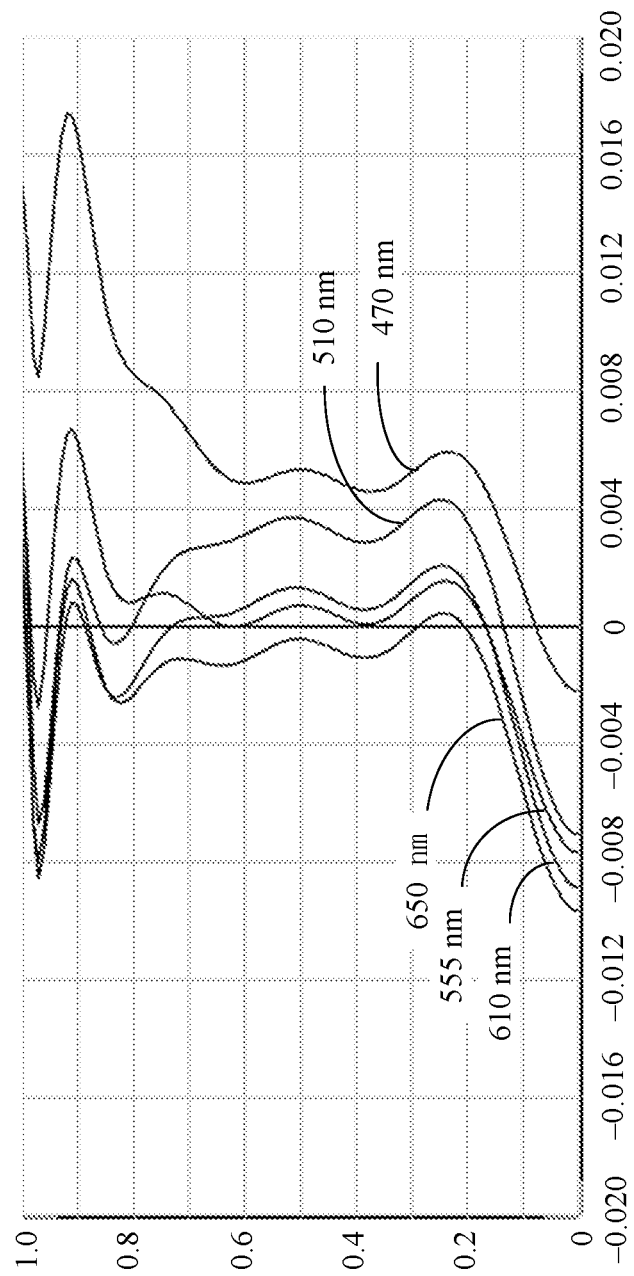
FIG. 5 shows axial aberrations of light with wavelengths of 650 nm, 610 nm, 555 nm, 510 nm, and 470 nm separately after the light passes through an optical lens in a first embodiment.

Specifically, FIG. 5 shows axial aberrations of light with wavelengths of 650 nm, 610 nm, 555 nm, 510 nm, and 470 nm separately after the light passes through the optical lens 10 in the first embodiment. In FIG. 5, a vertical coordinate represents a normalized pupil coordinate, and a horizontal coordinate represents an aberration in an axial direction, in a unit of millimeters. It can be learned from FIG. 5 that in this embodiment, the axial aberrations are controlled within a quite small range, and axial chromatic aberrations of the lens are all well corrected.

A solid line in FIG. 6 shows a chief ray incident angle curve of the optical lens 10 in the first embodiment. In FIG. 6, a vertical coordinate represents a chief ray incident angle, in a unit of degrees (°), and a horizontal coordinate unit represents a height of an image formed by the optical lens 10, in a unit of millimeters (mm). It can be learned from the figure that a maximum chief ray incident angle of the optical lens 10 in this embodiment reaches 36°, and therefore, the optical lens 10 can match the photosensitive element 20 (sensor) with a large chief ray incident angle.

FIG. 7(a), FIG. 7(b), and FIG. 7(c) show modulation contrast (MTF) curves of the optical lens 10 in the first embodiment at a normal temperature, −30° C., and +70° C., respectively, where the curves are used to indicate deformation differences between imaging of light passing through the optical lens 10 at a high temperature and at a low temperature and imaging of light passing through the optical lens 10 at a normal temperature. In FIG. 7(a), FIG. 7(b), and FIG. 7(c), a horizontal coordinate represents a spatial frequency, in a unit of cycle/mm, and a vertical coordinate represents a modulation contrast. Solid lines show modulation contrast curves of the optical lens 10 in different positions in a meridian direction, and dashed lines show modulation contrast curves of the optical lens 10 in different positions in a sagittal direction. It can be learned from the MTF curves of the optical lens 10 at different temperatures shown in FIG. 7(a), FIG. 7(b), and FIG. 7(c) that for the optical lens 10 in this embodiment, there are comparatively small deformation differences between imaging at a low temperature and at a high temperature and imaging at a normal temperature. When the optical lens 10 in this embodiment is compared with an existing optical lens, a warm-up drift is well corrected, so that the optical lens 10 in this embodiment can meet a requirement for clear imaging within a comparatively wide temperature range.

In this embodiment, each of the image side surfaces of the third lens 13 to the sixth lens 16 is provided with the second step structure, and each of the object side surfaces of a fourth lens 15 to the seventh lens 17 has the first step structure. A first area C1 of the first step structure of each lens is in contact with a fourth area D1 of a second step structure of an adjacent lens thereof. A third area C3 of the first step structure of each lens is in contact with a sixth area D3 of the second step structure of the adjacent lens thereof. In this embodiment, an included angle θ between the third area C3 of the first step structure and an optical axis of the lens is equal to 30°. A difference h between a distance from the first area C1 to a reference plane perpendicular to the lens and a distance from the second area C2 to the reference plane perpendicular to the lens is equal to 0.18 mm. A length L of a contact area between adjacent lenses in a radial direction meets: 0.28 mm≤L≤0.4 mm.

This application further provides a second embodiment of an optical lens 10. A difference between the optical lens 10 in the second embodiment and the optical lens 10 in the first embodiment lies in that the optical lens 10 in the second embodiment uses glass with a higher refractive index, and then a curvature radius, an aspheric coefficient, a center thickness, and the like that are of a lens are optimized, so that the optical lens 10 can present different optical effects. For details, refer to Table 4. Table 4 shows design parameters and results of the optical lens 10 in the second embodiment of this application.

TABLE 4

Design parameters and results of the optical lens 10 in the second embodiment

| | |
|---|---|
| Focal length f | 5.82 mm |
| Aperture value F# | 1.1 |
| Half FOV | 45° |
| Effective image height IH | 9.2 mm |
| Total optical length TTL | 19.0 mm |
| Maximum chief ray incident angle/° | 35.7° |
| Design wavelength | 650 nm, 610 nm, 555 nm, 510 nm, 470 nm |
| Refractive index nd of glass material in light d (with a wavelength of 587.6 nm) | 1.88 |
| $R_1/R_2$ | 0.54 |
| $f_4/f$ | 1.1 |
| $f_2/f$ | 1.88 |
| $F\#^2 \times TTL/IH$ | 2.5 |

Meanings of symbols in Table 4 are the same as the meanings of the symbols in Table 1.

Table 5 shows a curvature radius R, a center thickness, a refractive index (nd), and an Abbe number (vd) that are of each constituent lens of an optical lens 100 in the second embodiment of this application, as shown in Table 5.

TABLE 5

Curvature radius, thickness, refractive index, and Abbe number that are of each lens of the optical lens in the second embodiment

| | R | | Thickness | | nd | | vd |
|---|---|---|---|---|---|---|---|
| R1 | −8.44E+00 | d1 | 1.70E+00 | n1 | 1.54 | v1 | 56.0 |
| R2 | −1.56E+01 | a1 | 6.78E+00 | | | | |
| Stop | Infinity | / | −4.57E−01 | / | / | / | / |
| R3 | 1.71E+01 | d2 | 1.36E+00 | n2 | 1.88 | v2 | 37.2 |
| R4 | −2.17E+01 | a2 | 1.00E−01 | | | | |
| R5 | 6.45E+00 | d3 | 7.00E−01 | n3 | 1.66 | v3 | 20.4 |
| R6 | 3.48E+00 | a3 | 2.00E−01 | | | | |
| R7 | 4.53E+00 | d4 | 2.65E+00 | n4 | 1.54 | v4 | 56.0 |
| R8 | −1.22E+01 | a4 | 1.00E−01 | | | | |
| R9 | 8.23E+00 | d5 | 6.96E−01 | n5 | 1.66 | v5 | 20.4 |
| R10 | 5.38E+00 | a5 | 5.90E−01 | | | | |
| R11 | 1.62E+01 | d6 | 1.13E+00 | n6 | 1.54 | v6 | 56.0 |
| R12 | −1.68E+01 | a6 | 1.30E+00 | | | | |
| R13 | 9.95E+00 | d7 | 9.02E−01 | n7 | 1.64 | v7 | 23.5 |
| R14 | 3.42E+00 | a7 | 3.25E−01 | | | | |

Meanings of symbols in Table 5 are the same as the meanings of the symbols in Table 2. For brevity, details are not described herein again.

Table 6 shows aspheric coefficients of the optical lens 100 in the second embodiment of this application, as shown in Table 6.

TABLE 6

Aspheric coefficients of each lens of the optical lens in the second embodiment

Aspheric coefficients

| | k | a4 | a6 | a8 | a10 | a12 | a14 | a16 | a18 | a20 |
|---|---|---|---|---|---|---|---|---|---|---|
| R1 | −5.01E+00 | 3.06E−03 | −1.30E−04 | 4.64E−06 | −1.40E−07 | 3.15E−09 | −5.15E−11 | 5.92E−13 | −4.21E−15 | 1.33E−17 |
| R2 | −7.16E+00 | 3.94E−03 | −9.23E−05 | 2.34E−06 | −1.27E−07 | 1.15E−08 | −7.10E−10 | 2.30E−11 | −3.65E−13 | 2.26E−15 |
| Stop | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| R3 | −3.42E+01 | 3.76E−03 | −3.10E−04 | 2.30E−05 | −1.54E−06 | 4.74E−08 | 1.18E−08 | −2.93E−09 | 2.36E−10 | −6.65E−12 |
| R4 | −8.94E+00 | 7.60E−03 | −2.22E−03 | 5.51E−04 | −1.07E−04 | 1.53E−05 | −1.57E−06 | 1.06E−07 | −4.13E−09 | 6.94E−11 |
| R5 | −3.18E+00 | −3.99E−03 | −9.48E−04 | 1.15E−04 | 6.35E−05 | −2.27E−05 | 3.41E−06 | −2.79E−07 | 1.22E−08 | −2.27E−10 |
| R6 | −2.25E−01 | −1.20E−02 | 2.32E−03 | −1.93E−03 | 8.24E−04 | −1.97E−04 | 2.85E−05 | −2.49E−06 | 1.21E−07 | −2.54E−09 |
| R7 | −4.90E−01 | 5.63E−03 | 2.51E−04 | −1.51E−03 | 7.11E−04 | −1.76E−04 | 2.65E−05 | −2.44E−06 | 1.26E−07 | −2.82E−09 |
| R8 | 1.13E+00 | 2.85E−03 | −3.43E−04 | −7.99E−04 | 4.55E−04 | −1.24E−04 | 2.00E−05 | −1.92E−06 | 1.01E−07 | −2.23E−09 |
| R9 | −1.27E+00 | −4.21E−03 | 5.08E−04 | −1.01E−03 | 4.27E−04 | −8.92E−05 | 1.13E−05 | −8.21E−07 | 2.53E−08 | 5.27E−11 |
| R10 | −2.17E+00 | −6.45E−03 | 1.59E−03 | −6.44E−04 | 5.42E−05 | 4.25E−05 | −1.57E−05 | 2.63E−06 | −2.32E−07 | 8.47E−09 |
| R11 | −2.30E+01 | −5.05E−03 | 1.90E−03 | −7.82E−04 | 1.85E−04 | −2.60E−05 | −4.19E−07 | 9.50E−07 | −1.41E−07 | 6.49E−09 |
| R12 | 8.42E+00 | −1.02E−02 | 2.08E−03 | −1.67E−04 | −1.61E−04 | 8.70E−05 | −2.22E−05 | 3.19E−06 | −2.44E−07 | 7.70E−09 |
| R13 | −2.69E+01 | −4.35E−02 | 5.02E−03 | −1.72E−03 | 6.77E−04 | −1.70E−04 | 2.68E−05 | −2.57E−06 | 1.36E−07 | −3.05E−09 |
| R14 | −3.32E−01 | −3.94E−02 | 5.59E−03 | −7.89E−04 | 8.83E−05 | −8.21E−06 | 5.98E−07 | −3.05E−08 | 9.39E−10 | −1.31E−11 |

Meanings of symbols in Table 5 are the same as the meanings of the symbols in Table 3. For brevity, details are not described herein again.

In this embodiment, the provided aperture value F# of the optical lens 10 is 1.1, and the maximum chief ray incident angle is 35.7°. Compared with a common optical lens 10, the aperture value F# of the optical lens 10 is smaller. The maximum chief ray incident angle is 36°, so that the optical lens 10 can perform comparatively well in low illumination and can match a photosensitive element 20 with a large chief ray incident angle.

FIG. 8 to FIG. 10(c) are optical performance characterization diagrams of the optical lens 10 in the second embodiment.

Specifically, FIG. 8 shows axial aberrations of light with wavelengths of 650 nm, 610 nm, 555 nm, 510 nm, and 470 nm separately after the light passes through the optical lens 10 in the second embodiment. In FIG. 8, a vertical coordinate represents a normalized pupil coordinate, and a horizontal coordinate represents an aberration in an axial direction, in a unit of millimeters. It can be learned from FIG. 8 that in this embodiment, the axial aberrations are controlled within a quite small range, and axial chromatic aberrations of the lens are all well corrected.

A solid line in FIG. 9 shows a chief ray incident angle curve of the optical lens 10 in the second embodiment. In FIG. 9, a vertical coordinate represents a chief ray incident angle, in a unit of degrees (°), and a horizontal coordinate unit represents a height of an image formed by the optical lens 10, in a unit of millimeters (mm). It can be learned from the figure that a maximum chief ray incident angle of the optical lens 10 in this embodiment reaches 36°, and therefore, the optical lens 10 can match the photosensitive element 20 (sensor) with a large chief ray incident angle.

FIG. 10(a), FIG. 10(b), and FIG. 10(c) show modulation contrast (MTF) curves of the optical lens 10 in the second embodiment at a normal temperature, −30° C., and +70° C., respectively, where the curves are used to indicate deformation differences between imaging of light passing through the optical lens 10 at a high temperature and at a low temperature and imaging of light passing through the optical lens 10 at a normal temperature. In FIG. 10(a), FIG. 10(b), and FIG. 10(c), a horizontal coordinate represents a spatial frequency, in a unit of cycle/mm, and a vertical coordinate represents a modulation contrast. Solid lines show modulation contrast curves of the optical lens 10 in different positions in a meridian direction, and dashed lines show modulation contrast curves of the optical lens 10 in different positions in a sagittal direction. It can be learned from the MTF curves of the optical lens 10 at different temperatures shown in FIG. 10(a), FIG. 10(b), and FIG. 10(c) that for the optical lens 10 in this embodiment, there are comparatively small deformation differences between imaging at a low temperature and at a high temperature and imaging at a normal temperature. When the optical lens 10 in this embodiment is compared with an existing optical lens, a warm-up drift is well corrected, so that the optical lens 10 in this embodiment can meet a requirement for clear imaging within a comparatively wide temperature range.

This application further provides a third embodiment of an optical lens 10. A difference between the optical lens 10 in the third embodiment and the optical lens 10 in the first embodiment lies in that the optical lens 10 in the third embodiment uses glass with a lower refractive index, and then a curvature radius, an aspheric coefficient, a center thickness, and the like that are of a lens are optimized. For details, refer to Table 7. Table 7 shows optical parameters and results of the optical lens 10 in this embodiment.

According to the foregoing relational expressions, design parameters of the optical lens 10 in the third embodiment of this application are shown in Table 7. For parameter meanings, refer to related descriptions in the first embodiment.

TABLE 7

Design parameters and results of the optical lens 10 in the third embodiment

| | |
|---|---|
| Focal length f | 5.86 mm |
| Aperture value F# | 1.1 |
| Half FOV | 45° |
| Effective image height IH | 9.2 mm |
| Total optical length TTL | 19.0 mm |
| Maximum chief ray incident angle/° | 36.5° |
| Design wavelength | 650 nm, 610 nm, 555 nm, 510 nm, 470 nm |
| Refractive index nd of glass material in light d (with a wavelength of 587.6 nm) | 1.55 |
| $R_1/R_2$ | 0.44 |
| $f_4/f$ | 1.15 |
| $f_2/f$ | 1.85 |
| $F\#^2 \times TTL/IH$ | 2.5 |

Meanings of symbols in Table 7 are the same as the meanings of the symbols in Table 1.

Table 8 shows a curvature radius R, a center thickness, a refractive index (nd), and an Abbe number (vd) that are of each constituent lens of an optical lens 100 in the third embodiment of this application, as shown in Table 8.

TABLE 8

Curvature radius, thickness, refractive index, and Abbe number that are of each lens of the optical lens in the third embodiment

|  | R |  | Thickness |  | nd |  | vd |
|---|---|---|---|---|---|---|---|
| R1 | −9.22E+00 | d1 | 1.70E+00 | n1 | 1.54 | v1 | 56.0 |
| R2 | −2.09E+01 | a1 | 7.04E+00 |  |  |  |  |
| Stop | Infinity | / | −7.57E−01 | / | / | / | / |
| R3 | 1.08E+01 | d2 | 1.87E+00 | n2 | 1.55 | v2 | 71.7 |
| R4 | −1.26E+01 | a2 | 1.00E−01 |  |  |  |  |
| R5 | 5.46E+00 | d3 | 7.58E−01 | n3 | 1.66 | v3 | 20.4 |
| R6 | 3.56E+00 | a3 | 2.00E−01 |  |  |  |  |
| R7 | 4.67E+00 | d4 | 2.36E+00 | n4 | 1.54 | v4 | 56.0 |
| R8 | −1.42E+01 | a4 | 1.00E−01 |  |  |  |  |
| R9 | 7.90E+00 | d5 | 5.00E−01 | n5 | 1.66 | v5 | 20.4 |
| R10 | 5.29E+00 | a5 | 7.80E−01 |  |  |  |  |
| R11 | 2.99E+01 | d6 | 9.34E−01 | n6 | 1.54 | v6 | 56.0 |
| R12 | −2.33E+01 | a6 | 1.18E+00 |  |  |  |  |
| R13 | 1.07E+01 | d7 | 8.77E−01 | n7 | 1.64 | v7 | 23.5 |
| R14 | 3.46E+00 | a7 | 3.10E−01 |  |  |  |  |

Meanings of symbols in Table 8 are the same as the meanings of the symbols in Table 2. For brevity, details are not described herein again.

Table 9 shows aspheric coefficients of the optical lens 100 in the third embodiment of this application, as shown in Table 9.

TABLE 9

Aspheric coefficients of each lens of the optical lens in the third embodiment

| | Aspheric coefficients | | | | | | | | |
|---|---|---|---|---|---|---|---|---|---|
| k | a4 | a6 | a8 | a10 | a12 | a14 | a16 | a18 | a20 |
| R1 −6.29E+00 | 3.87E−03 | −1.85E−04 | 7.21E−06 | −2.18E−07 | 4.00E−09 | −3.39E−11 | −8.34E−14 | 3.99E−15 | −2.36E−17 |
| R2 −4.61E+01 | 4.55E−03 | −7.56E−05 | −2.97E−06 | 4.73E−07 | −2.43E−08 | 2.74E−10 | 1.63E−11 | −5.41E−13 | 4.56E−15 |
| Stop 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| R3 −1.48E+01 | 4.00E−03 | −2.73E−04 | 1.23E−05 | 5.71E−07 | −2.85E−07 | 4.67E−08 | −4.67E−09 | 2.54E−10 | −5.75E−12 |
| R4 −3.76E+00 | 7.79E−03 | −2.46E−03 | 6.08E−04 | −1.08E−04 | 1.31E−05 | −1.08E−06 | 5.70E−08 | −1.77E−09 | 2.45E−11 |
| R5 −2.46E+00 | −3.67E−03 | −2.33E−04 | −1.93E−04 | 1.51E−04 | −4.13E−05 | 6.02E−06 | −4.98E−07 | 2.21E−08 | −4.10E−10 |
| R6 −2.65E−01 | −1.33E−02 | 3.18E−03 | −2.20E−03 | 9.08E−04 | −2.22E−04 | 3.30E−05 | −2.92E−06 | 1.41E−07 | −2.87E−09 |
| R7 −7.24E−01 | 2.63E−03 | 1.25E−03 | −1.72E−03 | 7.62E−04 | −1.90E−04 | 2.87E−05 | −2.59E−06 | 1.29E−07 | −2.73E−09 |
| R8 −1.26E+00 | 7.56E−03 | −3.76E−03 | 4.34E−03 | 1.89E−04 | −9.20E−05 | 1.86E−05 | −2.02E−06 | 1.14E−07 | −2.62E−09 |
| R9 −1.07E+00 | −3.36E−03 | −6.76E−04 | −1.47E−03 | 1.00E−03 | −3.17E−04 | 6.25E−05 | −7.76E−06 | 5.45E−07 | −1.65E−08 |
| R10 −2.09E+00 | −8.26E−03 | 2.32E−03 | −1.24E−03 | 2.71E−04 | 3.37E−05 | −2.69E−05 | 5.49E−06 | −5.21E−07 | 1.94E−08 |
| R11 −5.00E+01 | −6.76E−03 | 2.68E−03 | −1.36E−03 | 4.45E−04 | −1.10E−04 | 1.80E−05 | −1.68E−06 | 7.21E−08 | −5.89E−10 |
| R12 4.82E+01 | −1.32E−02 | 5.24E−03 | −2.54E−03 | 1.03E−03 | −3.07E−04 | 6.04E−05 | −7.40E−06 | 5.09E−07 | −1.49E−08 |
| R13 −2.66E+01 | −5.07E−02 | 7.95E−03 | −2.84E−03 | 1.03E−03 | −2.44E−04 | 3.64E−05 | −3.31E−06 | 1.72E−07 | −3.94E−09 |
| R14 −3.02E−01 | −4.41E−02 | 7.48E−03 | −1.30E−03 | 1.80E−04 | −1.94E−05 | 1.51E−06 | −7.73E−08 | 2.34E−09 | −3.21E−11 |

Meanings of symbols in Table 9 are the same as the meanings of the symbols in Table 3. For brevity, details are not described herein again.

In this embodiment, the provided aperture value F# of the optical lens 10 is 1.1, and the maximum chief ray incident angle is 36°. Compared with a common optical lens 10, the aperture value F# of the optical lens 10 is smaller. The maximum chief ray incident angle is 36.5°, so that the optical lens 10 can perform comparatively well in low illumination and can match a photosensitive element 20 with a large chief ray incident angle.

FIG. 11 to FIG. 13(c) are optical performance characterization diagrams of the optical lens 10 in the third embodiment.

Specifically, FIG. 11 shows axial aberrations of light with wavelengths of 650 nm, 610 nm, 555 nm, 510 nm, and 470 nm separately after the light passes through the optical lens 10 in the third embodiment. In FIG. 11, a vertical coordinate represents a normalized pupil coordinate, and a horizontal coordinate represents an aberration in an axial direction, in a unit of millimeters. It can be learned from FIG. 11 that in this embodiment, the axial aberrations are controlled within a quite small range, and axial chromatic aberrations of the lens are all well corrected.

A solid line in FIG. 12 shows a chief ray incident angle curve of the optical lens 10 in the third embodiment. In FIG. 9, a vertical coordinate represents a chief ray incident angle, in a unit of degrees (°), and a horizontal coordinate unit represents a height of an image formed by the optical lens 10, in a unit of millimeters (mm). It can be learned from the figure that a maximum chief ray incident angle of the optical lens 10 in this embodiment reaches 36°, and therefore, the optical lens 10 can match the photosensitive element 20 (sensor) with a large chief ray incident angle.

FIG. 13(a), FIG. 13(b), and FIG. 13(c) show modulation contrast (MTF) curves of the optical lens 10 in the third embodiment at a normal temperature, −30° C., and +70° C., respectively, where the curves are used to indicate deformation differences between imaging of light passing through the optical lens 10 at a high temperature and at a low temperature and imaging of light passing through the optical lens 10 at a normal temperature. In FIG. 13(a), FIG. 13(b), and FIG. 13(c), a horizontal coordinate represents a spatial frequency, in a unit of cycle/mm, and a vertical coordinate represents a modulation contrast. Solid lines show modulation contrast curves of the optical lens 10 in different positions in a meridian direction, and dashed lines show modulation contrast curves of the optical lens 10 in different positions in a sagittal direction. It can be learned from the MTF curves of the optical lens 10 at different temperatures shown in FIG. 13(a), FIG. 13(b), and FIG. 13(c) that for the optical lens 10 in this embodiment, there are comparatively small deformation differences between imaging at a low temperature and at a high temperature and imaging at a normal temperature. When the optical lens 10 in this embodiment is compared with an existing optical lens, a warm-up drift is well corrected, so that the optical lens 10 in this embodiment can meet a requirement for clear imaging within a comparatively wide temperature range.

This application further provides a fourth embodiment of an optical lens 10. A difference between the optical lens 10 in the fourth embodiment and the optical lens 10 in the first embodiment lies in that for the optical lens 10 in the fourth embodiment, an aperture value F# of the lens is increased and a total track length TTL is reduced, so that the optical lens 10 can present different optical effects. For details, refer to Table 10. Table 10 shows optical parameters and results of the optical lens 10 in this embodiment.

TABLE 10

Design parameters and results of the optical lens 10 in the fourth embodiment

| | |
|---|---|
| Focal length f | 5.86 mm |
| Aperture value F# | 1.5 |
| Half FOV | 45° |
| Effective image height IH | 9.2 mm |
| Total optical length TTL | 11.0 mm |
| Maximum chief ray incident angle/° | 36.0 |
| Design wavelength | 650 nm, 610 nm, 555 nm, 510 nm, 470 nm |

TABLE 11

Curvature radius, thickness, refractive index, and Abbe number that are of each lens of the optical lens in the fourth embodiment

| | R | | Thickness | | nd | | vd |
|---|---|---|---|---|---|---|---|
| R1 | −8.85E+00 | d1 | 5.00E−01 | n1 | 1.54 | v1 | 56.0 |
| R2 | −3.44E+01 | a1 | 1.05E+00 | | | | |
| Stop | Infinity | / | 8.72E−02 | / | / | / | / |
| R3 | 1.32E+01 | d2 | 6.96E−01 | n2 | 1.55 | v2 | 71.7 |
| R4 | −1.62E+01 | a2 | 1.00E−01 | | | | |
| R5 | 6.08E+00 | d3 | 6.34E−01 | n3 | 1.77 | v3 | 49.2 |
| R6 | 3.36E+00 | a3 | 4.91E−01 | | | | |
| R7 | 4.53E+00 | d4 | 1.87E+00 | n4 | 1.54 | v4 | 56.0 |
| R8 | −1.06E+01 | a4 | 1.00E−01 | | | | |
| R9 | 7.40E+00 | d5 | 5.76E−01 | n5 | 1.66 | v5 | 20.4 |
| R10 | 6.79E+00 | a5 | 6.42E−01 | | | | |
| R11 | 1.28E+01 | d6 | 1.19E+00 | n6 | 1.54 | v6 | 56.0 |
| R12 | −1.24E+01 | a6 | 1.35E+00 | | | | |
| R13 | 2.99E+02 | d7 | 7.00E−01 | n7 | 1.64 | v7 | 23.5 |
| R14 | 3.42E+00 | a7 | 3.12E−01 | | | | |

Meanings of symbols in Table 11 are the same as the meanings of the symbols in Table 2. For brevity, details are not described herein again.

Table 12 shows aspheric coefficients of the optical lens 100 in the fourth embodiment of this application, as shown in Table 12.

TABLE 12

Aspheric coefficients of each lens of the optical lens in the fourth embodiment

| | k | a4 | a6 | a8 | a10 | a12 | a14 | a16 | a18 | a20 |
|---|---|---|---|---|---|---|---|---|---|---|
| R1 | −1.31E+00 | 2.19E−02 | −4.18E−03 | 5.05E−04 | −3.93E−05 | 1.88E−06 | −5.35E−08 | 8.64E−10 | −6.92E−12 | 1.84E−14 |
| R2 | −5.00E+01 | 2.87E−02 | −4.41E−03 | 2.94E−04 | 3.13E−05 | −8.20E−06 | 7.58E−07 | −3.71E−08 | 9.51E−10 | −1.00E−11 |
| Stop | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| R3 | −3.39E+01 | 1.31E−02 | −2.90E−03 | 5.09E−05 | 2.03E−04 | −7.77E−05 | 1.37E−05 | −1.28E−06 | 6.03E−08 | −1.14E−09 |
| R4 | 7.37E+00 | 2.46E−02 | −1.67E−02 | 8.49E−03 | −3.07E−03 | 7.35E−04 | −1.14E−04 | 1.11E−05 | −6.08E−07 | 1.42E−08 |
| R5 | −3.91E+00 | 6.16E−03 | −1.60E−02 | 1.01E−02 | −3.81E−03 | 8.89E−04 | −1.30E−04 | 1.16E−05 | −5.87E−07 | 1.29E−08 |
| R6 | −4.00E−01 | −1.97E−02 | 5.08E−04 | 7.44E−04 | −1.47E−04 | −5.43E−05 | 3.22E−05 | −6.29E−06 | 5.51E−07 | −1.84E−08 |
| R7 | −1.29E−01 | 3.32E−03 | −1.86E−03 | 2.41E−04 | 1.32E−04 | −8.62E−05 | 2.46E−05 | −3.60E−06 | 2.59E−07 | −7.24E−09 |
| R8 | 8.38E+00 | 4.53E−03 | −1.39E−02 | 8.77E−03 | −3.33E−03 | 8.15E−04 | −1.23E−04 | 1.09E−05 | −5.19E−07 | 1.02E−08 |
| R9 | −1.59E+01 | 1.58E−04 | −1.42E−02 | 6.25E−03 | −1.23E−03 | −9.57E−05 | 1.44E−04 | −3.90E−05 | 4.71E−06 | −2.21E−07 |
| R10 | −2.24E+00 | −4.03E−03 | −5.65E−03 | 2.09E−03 | −5.22E−04 | 2.00E−04 | −6.22E−05 | 1.20E−05 | −1.27E−06 | 5.48E−08 |
| R11 | −1.72E+01 | 2.19E−04 | −4.36E−04 | −6.46E−04 | 4.96E−04 | −1.86E−04 | 4.18E−05 | −5.52E−06 | 3.87E−07 | −1.10E−08 |
| R12 | 1.48E+01 | −6.37E−04 | −3.85E−06 | 4.23E−07 | 5.21E−08 | −4.86E−10 | −1.78E−09 | −3.92E−10 | −2.42E−11 | −8.88E−21 |
| R13 | 5.00E+01 | −5.40E−02 | 5.00E−03 | −5.18E−04 | 1.85E−04 | −3.32E−05 | 5.12E−07 | 5.72E−07 | −6.65E−08 | 2.28E−09 |
| R14 | −3.21E−01 | −4.48E−02 | 7.12E−03 | −1.04E−03 | 1.22E−04 | −1.19E−05 | 9.34E−07 | −5.26E−08 | 1.82E−09 | −2.83E−11 |

TABLE 10-continued

Design parameters and results of the optical lens 10 in the fourth embodiment

| | |
|---|---|
| Refractive index nd of glass material in light d (with a wavelength of 587.6 nm) | 1.77 |
| $R_1/R_2$ | 0.25 |
| $f_4/f$ | 1.06 |
| $f_2/f$ | 1.65 |
| $F\#^2 \times TTL/IH$ | 2.69 |

Meanings of symbols in Table 10 are the same as the meanings of the symbols in Table 1.

Table 11 shows a curvature radius R, a center thickness, a refractive index (nd), and an Abbe number (vd) that are of each constituent lens of an optical lens 100 in the fourth embodiment of this application, as shown in Table 11.

Meanings of symbols in Table 12 are the same as the meanings of the symbols in Table 3. For brevity, details are not described herein again.

In this embodiment, the provided aperture value F# of the optical lens 10 is 1.5, and the maximum chief ray incident angle is 36°. Compared with a common optical lens 10, the aperture value F# of the optical lens 10 is smaller. The maximum chief ray incident angle is 36°, so that the optical lens 10 can perform comparatively well in low illumination and can match a photosensitive element 20 with a large chief ray incident angle.

FIG. 14 to FIG. 16(c) are optical performance characterization diagrams of the optical lens 10 in the fourth embodiment.

Specifically, FIG. 14 shows axial aberrations of light with wavelengths of 650 nm, 610 nm, 555 nm, 510 nm, and 470 nm separately after the light passes through the optical lens 10 in the fourth embodiment. In FIG. 14, a vertical coordinate represents a normalized pupil coordinate, and a horizontal coordinate represents an aberration in an axial direction, in a unit of millimeters. It can be learned from FIG. 14 that in this embodiment, the axial aberrations are controlled within a quite small range, and axial chromatic aberrations of the lens are all well corrected.

A solid line in FIG. 15 shows a chief ray incident angle curve of the optical lens 10 in the fourth embodiment. In FIG. 15, a vertical coordinate represents a chief ray incident angle, in a unit of degrees (°), and a horizontal coordinate unit represents a height of an image formed by the optical lens 10, in a unit of millimeters (mm). It can be learned from the figure that a maximum chief ray incident angle of the optical lens 10 in this embodiment reaches 36°, and therefore, the optical lens 10 can match the photosensitive element 20 with a large chief ray incident angle.

FIG. 16(a), FIG. 16(b), and FIG. 16(c) show modulation contrast (MTF) curves of the optical lens 10 in the fourth embodiment at a normal temperature, −30° C., and +70° C., respectively, where the curves are used to indicate deformation differences between imaging of light passing through the optical lens 10 at a high temperature and at a low temperature and imaging of light passing through the optical lens 10 at a normal temperature. In FIG. 16(a), FIG. 16(b), and FIG. 16(c), a horizontal coordinate represents a spatial frequency, in a unit of cycle/mm, and a vertical coordinate represents a modulation contrast. Solid lines show modulation contrast curves of the optical lens 10 in different positions in a meridian direction, and dashed lines show modulation contrast curves of the optical lens 10 in different positions in a sagittal direction. It can be learned from the MTF curves of the optical lens 10 at different temperatures shown in FIG. 16(a), FIG. 16(b), and FIG. 16(c) that for the optical lens 10 in this embodiment, there are comparatively small deformation differences between imaging at a low temperature and at a high temperature and imaging at a normal temperature. When the optical lens 10 in this embodiment is compared with an existing optical lens, a warm-up drift is well corrected, so that the optical lens 10 in this embodiment can meet a requirement for clear imaging within a comparatively wide temperature range.

In this embodiment, an included angle θ between a third area C3 of a first step structure on each of object side surfaces of a fourth lens 15 to a seventh lens 17 and an optical axis of the lens is equal to 25°. A difference h between a distance from the first area C1 on each of image side surfaces of a third lens 13 to a sixth lens 16 to a reference plane perpendicular to the lens and a distance from the second area C2 on each of the image side surfaces of the third lens 13 to the sixth lens 16 to the reference plane perpendicular to the lens is equal to 0.15 mm. A length L of a contact area between adjacent lenses in a radial direction meets: 0.25 mm≤L≤0.35 mm.

This application further provides a fifth embodiment of an optical lens 10. A difference between the optical lens 10 in the fifth embodiment and the optical lens 10 in the first embodiment lies in that for the optical lens 10 in the fifth embodiment, a lens aperture is increased (an aperture value F# is reduced) by using means such as reducing an image height IH of the lens and increasing a total track length TTL, so that the optical lens 10 can present different optical effects. For details, refer to Table 13. Table 13 shows design parameters and results of the optical lens 10 in this embodiment.

TABLE 13

Design parameters and results of the optical lens 10 in the fifth embodiment

| | |
|---|---|
| Focal length f | 5.60 mm |
| Aperture value F# | 0.8 |
| Half FOV | 25° |
| Effective image height IH | 5.8 |
| Total optical length TTL | 22.8 mm |
| Maximum chief ray incident angle/° | 26.5 |
| Design wavelength | 650 nm, 610 nm, 555 nm, 510 nm, 470 nm |
| Refractive index nd of glass material in light d (with a wavelength of 587.6 nm) | 1.77 |
| $R_1/R_2$ | 0.9 |
| $f_4/f$ | 1.25 |
| $f_2/f$ | 2.25 |
| $F\#^2 \times TTL/IH$ | 2.52 |

Meanings of symbols in Table 13 are the same as the meanings of the symbols in Table 1.

Table 14 shows a curvature radius R, a center thickness, a refractive index (nd), and an Abbe number (vd) that are of each constituent lens of an optical lens 100 in the fifth embodiment of this application, as shown in Table 14.

TABLE 14

Curvature radius, thickness, refractive index, and Abbe number that are of each lens of the optical lens in the fifth embodiment

| | R | | Thickness | | nd | | vd |
|---|---|---|---|---|---|---|---|
| R1 | −1.30E+01 | d1 | 3.28E+00 | n1 | 1.54 | v1 | 56.0 |
| R2 | −1.44E+01 | a1 | 7.11E+00 | | | | |
| Stop | Infinity | / | 4.11E−01 | / | / | / | / |
| R3 | 2.18E+01 | d2 | 2.50E+00 | n2 | 1.55 | v2 | 71.7 |
| R4 | −1.69E+01 | a2 | 1.81E−01 | | | | |
| R5 | 7.27E+00 | d3 | 8.96E−01 | n3 | 1.66 | v3 | 20.4 |
| R6 | 3.90E+00 | a3 | 3.52E−01 | | | | |
| R7 | 5.16E+00 | d4 | 2.61E+00 | n4 | 1.77 | v4 | 49.2 |
| R8 | −1.20E+01 | a4 | 3.16E−01 | | | | |
| R9 | 8.95E+00 | d5 | 9.91E−01 | n5 | 1.66 | v5 | 20.4 |
| R10 | 5.09E+00 | a5 | 2.42E−01 | | | | |
| R11 | 1.41E+01 | d6 | 1.68E+00 | n6 | 1.54 | v6 | 56.0 |
| R12 | −2.49E+01 | a6 | 6.48E−01 | | | | |
| R13 | 1.74E+00 | d7 | 4.99E−01 | n7 | 1.64 | v7 | 23.5 |
| R14 | 1.57E+00 | a7 | 5.51E−01 | | | | |

Meanings of symbols in Table 14 are the same as the meanings of the symbols in Table 2. For brevity, details are not described herein again.

Table 15 shows aspheric coefficients of the optical lens 100 in the fifth embodiment of this application, as shown in Table 15.

TABLE 15

Aspheric coefficients of each lens of the optical lens in the fifth embodiment

Aspheric coefficients

| | k | a4 | a6 | a8 | a10 | a12 | a14 | a16 | a18 | a20 |
|---|---|---|---|---|---|---|---|---|---|---|
| R1 | −7.20E+00 | 1.71E−03 | −3.70E−05 | 2.08E−06 | −1.54E−07 | 8.04E−09 | −2.62E−10 | 5.09E−12 | −5.45E−14 | 2.46E−16 |
| R2 | −1.46E+01 | 1.83E−03 | −3.26E−06 | 4.07E−06 | −5.83E−07 | 4.47E−08 | −1.95E−09 | 4.88E−11 | −6.75E−13 | 4.07E−15 |
| Stop | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| R3 | −2.55E+01 | 2.00E−03 | −3.39E−05 | −3.35E−05 | 9.00E−06 | −1.21E−06 | 9.45E−08 | −4.33E−09 | 1.07E−10 | −1.11E−12 |
| R4 | −1.31E+00 | 3.98E−03 | −9.76E−04 | 1.86E−04 | −2.55E−05 | 2.44E−06 | −1.61E−07 | 7.02E−09 | −1.81E−10 | 2.06E−12 |
| R5 | −2.87E+00 | −2.32E−03 | −2.94E−04 | 2.02E−05 | 1.44E−05 | −3.51E−06 | 3.74E−07 | −2.14E−08 | 6.44E−10 | −8.07E−12 |
| R6 | −2.13E−01 | −9.09E−03 | 1.80E−03 | −9.17E−04 | 2.79E−04 | −4.94E−05 | 5.33E−06 | −3.45E−07 | 1.24E−08 | −1.89E−10 |
| R7 | −7.84E−01 | 7.35E−04 | 6.38E−04 | −6.04E−04 | 1.97E−04 | −3.51E−05 | 3.78E−06 | −2.48E−07 | 9.15E−09 | −1.47E−10 |
| R8 | −5.73E+00 | 4.58E−03 | −3.46E−03 | 1.38E−03 | −3.21E−04 | 4.72E−05 | −4.61E−06 | 2.92E−07 | −1.09E−08 | 1.81E−10 |
| R9 | −1.10E+01 | 2.43E−03 | −7.32E−03 | 2.82E−03 | −5.62E−04 | 6.61E−05 | −5.12E−06 | 3.15E−07 | −1.56E−08 | 4.05E−10 |
| R10 | −3.73E+00 | 1.39E−02 | −1.29E−02 | 2.81E−03 | 3.38E−05 | −1.15E−04 | 1.99E−05 | −1.41E−06 | 3.76E−08 | −3.28E−11 |
| R11 | 7.82E+00 | 1.94E−02 | −4.95E−03 | −2.91E−03 | 2.14E−03 | −5.98E−04 | 9.08E−05 | −7.84E−06 | 3.62E−07 | −6.90E−09 |
| R12 | 4.98E+01 | −2.72E−02 | 1.78E−02 | −8.52E−03 | 2.83E−03 | −6.28E−04 | 8.97E−05 | −7.87E−06 | 3.84E−07 | −7.94E−09 |
| R13 | −6.89E+00 | 4.60E−02 | −6.22E−02 | 2.32E−02 | −5.87E−03 | 1.10E−03 | −1.44E−04 | 1.19E−05 | −5.61E−07 | 1.13E−08 |
| R14 | −2.78E+00 | 5.19E−03 | −2.61E−02 | 9.66E−03 | −1.73E−03 | 1.64E−04 | −7.55E−06 | 9.24E−08 | 4.39E−09 | −1.19E−10 |

Meanings of symbols in Table 15 are the same as the meanings of the symbols in Table 3. For brevity, details are not described herein again.

In this embodiment, the provided aperture value F# of the optical lens 10 is 0.8, and the maximum chief ray incident angle is 26.5°. Compared with a common optical lens 10, the aperture value F# of the optical lens 10 is smaller. The maximum chief ray incident angle is 26.5°, so that the optical lens 10 can perform comparatively well in low illumination and can match a photosensitive element 20 with a large chief ray incident angle.

FIG. 17 to FIG. 19(c) are optical performance characterization diagrams of the optical lens 10 in the first embodiment.

Specifically, FIG. 17 shows axial aberrations of light with wavelengths of 650 nm, 610 nm, 555 nm, 510 nm, and 470 nm separately after the light passes through the optical lens 10 in the fifth embodiment. In FIG. 17, a vertical coordinate represents a normalized pupil coordinate, and a horizontal coordinate represents an aberration in an axial direction, in a unit of millimeters. It can be learned from FIG. 17 that in this embodiment, the axial aberrations are controlled within a quite small range, and axial chromatic aberrations of the lens are all well corrected.

A solid line in FIG. 18 shows a chief ray incident angle curve of the optical lens 10 in the fifth embodiment. In FIG. 18, a vertical coordinate represents a chief ray incident angle, in a unit of degrees (°), and a horizontal coordinate unit represents a height of an image formed by the optical lens 10, in a unit of millimeters (mm). It can be learned from the figure that a maximum chief ray incident angle of the optical lens 10 in this embodiment reaches 36°, and therefore, the optical lens 10 can match the photosensitive element 20 with a large chief ray incident angle.

FIG. 19(a), FIG. 19(b), and FIG. 19(c) show modulation contrast (MTF) curves of the optical lens 10 in the fifth embodiment at a normal temperature, −30° C., and +70° C., respectively, where the curves are used to indicate deformation differences between imaging of light passing through the optical lens 10 at a high temperature and at a low temperature and imaging of light passing through the optical lens 10 at a normal temperature. In FIG. 19(a), FIG. 19(b), and FIG. 19(c), a horizontal coordinate represents a spatial frequency, in a unit of cycle/mm, and a vertical coordinate represents a modulation contrast. Solid lines show modulation contrast curves of the optical lens 10 in different positions in a meridian direction, and dashed lines show modulation contrast curves of the optical lens 10 in different positions in a sagittal direction. It can be learned from the MTF curves of the optical lens 10 at different temperatures shown in FIG. 19(a), FIG. 19(b), and FIG. 19(c) that for the optical lens 10 in this embodiment, there are comparatively small deformation differences between imaging at a low temperature and at a high temperature and imaging at a normal temperature. When the optical lens 10 in this embodiment is compared with an existing optical lens, a warm-up drift is well corrected, so that the optical lens 10 in this embodiment can meet a requirement for clear imaging within a comparatively wide temperature range.

In this embodiment, an included angle θ between a third area C3 of a first step structure on each of object side surfaces of a fourth lens 15 to a seventh lens 17 and an optical axis of the lens is equal to 30°. A difference h between a distance from the first area C1 on each of image side surfaces of a third lens 13 to a sixth lens 16 to a reference plane perpendicular to the lens and a distance from the second area C2 on each of the image side surfaces of the third lens 13 to the sixth lens 16 to the reference plane perpendicular to the lens is equal to 0.18 mm. A length L of a contact area between adjacent lenses in a radial direction meets: 0.3 mm≤L≤0.45 mm.

The optical lens in this application includes the first lens 11 with a negative focal power, the second lens 12 with a positive focal power, the third lens 13 with a negative focal power, the fourth lens 14 with a positive focal power, the fifth lens 15 with a positive focal power, the sixth lens 16 with a focal power, and the seventh lens 17 with a focal power that are sequentially arranged along the optical axis from the object side to the image side. The object side surface of the first lens 11 is concave in a position near the optical axis, and the image side surface of the first lens 11 is convex in a position near the optical axis. The object side surface of the seventh lens 17 is convex in a position near the optical axis, and the image side surface of the seventh lens 17 is concave in a position near the optical axis. The optical lens 100 in the embodiments of this application can implement a small aperture value F#, thereby implementing design of a large aperture and a high resolution for the optical lens 100. In addition, in the embodiments of this application, the lens closest to the image side is the M-shaped lens, and can implement a function of a large chief ray incident angle for the optical lens 100. In the embodiments of this application, the plastic lens and the glass lens are used together, so that the warm-up drift can be corrected and costs can be reduced, thereby implementing high-reliability and low-cost design for the optical lens.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical lens, comprising:
    a plurality of coaxially disposed lenses, comprising:
        a first lens, wherein the first lens has a negative focal power, an object side surface of the first lens is concave in a paraxial position, and an image side surface of the first lens is convex in a paraxial position;
        a second lens, wherein the second lens has a positive focal power;
        a third lens, wherein the third lens has a negative focal power;
        a fourth lens, wherein the fourth lens has a positive focal power;
        a fifth lens, wherein the fifth lens has a negative focal power;
        a sixth lens, wherein the sixth lens has a focal power; and
        a seventh lens, wherein the seventh lens has a focal power, an object side surface of the seventh lens is convex in a paraxial position, and an image side surface of the seventh lens is concave in a paraxial position, and wherein
            the first lens, the second lens, the third lens, the fourth lens, the fifth lens, the sixth lens and the seventh lens are disposed in sequence from an object side to an image side, wherein
            an aperture value F# of the optical lens meets: $0.6 \leq F\# \leq 2.0$.

2. The optical lens according to claim 1, wherein the seventh lens is an M-shaped lens, and there are two symmetrical inflection points on each of surface inclination angles of the object side surface and the image side surface of the M-shaped lens except for a vertex center.

3. The optical lens according to claim 1, wherein the plurality of coaxially disposed lenses further comprise at least one glass lens and at least one plastic lens, wherein a refractive index of the at least one glass lens changes with a temperature, and the refractive index of the at least one glass lens and the temperature meet: dn/dT>0, wherein a refractive index of the at least one plastic lens changes with a temperature, and the refractive index of the at least one plastic lens and the temperature meet: dn/dT<0, and wherein dn represents a change value of a refractive index per unit time, and dT represents a change value of a temperature per unit time.

4. The optical lens according to claim 1, wherein a refractive index of the second lens in light with a wavelength of 587.6 nm meets: $1.4 \leq nd \leq 2.1$.

5. The optical lens according to claim 1, wherein the optical lens meets: $F\#^2 \times TTL/IH \geq 2.0$, wherein F# is the aperture value of the optical lens, IH is an image height of the optical lens, and TTL is a total track length of the optical lens.

6. The optical lens according to claim 1, wherein a curvature radius R1 of the object side surface of the first lens in the paraxial position and a curvature radius R2 of the image side surface of the first lens in the paraxial position meet: $R1/R2 \geq 0.2$.

7. The optical lens according to claim 1, wherein a focal length f2 of the second lens and a focal length f of the optical lens meet: $f2/f \geq 1.0$.

8. The optical lens according to claim 1, wherein a focal length f4 of the fourth lens and a focal length f of the optical lens meet: $f4/f \leq 1.5$.

9. The optical lens according to claim 1, wherein a first step structure is disposed around an edge of an object side surface or image side surface of at least one of the plurality of coaxially disposed lenses, wherein the first step structure comprises a first area, a second area, and a third area connected between the first area and the second area, wherein the first area is closer to the edge of a first step structure lens of the at least one of the plurality of coaxially disposed lenses relative to the second area, wherein a distance from a reference plane to a position in which the first area and the third area are connected is different from a distance from the reference plane to a position in which the second area and the third area are connected, and wherein the reference plane is perpendicular to an extension direction of an optical axis of the optical lens, and wherein
    a second step structure is disposed around an edge of a second step structure lens of the at least one of the plurality of coaxially disposed lenses adjacent to the first step structure lens provided with the first step structure, wherein the second step structure comprises a fourth area, a fifth area, and a sixth area connected between the fourth area and the fifth area, wherein the fourth area is closer to the edge of the second step structure lens relative to the fifth area, wherein a distance from the reference plane to a position in which the fourth area and the sixth area are connected is different from a distance from the reference plane to a position in which the fifth area and the sixth area are connected, and wherein at least a part of the first area is in contact with at least a part of the fourth area, and at least a part of the third area is in contact with at least a part of the sixth area.

10. The optical lens according to claim 9, wherein an included angle between the third area and an optical axis of the first step structure lens provided with the third area is θ, and a range of θ meets the following condition: $0° < \theta \leq 45°$.

11. The optical lens according to claim 9, wherein a difference h between the distance from the reference plane to the position in which the first area and the third area are connected and the distance from the reference plane to the position in which the second area and the third area are connected meets the following condition: $0.08 \text{ mm} \leq h \leq 0.4 \text{ mm}$.

12. The optical lens according to claim 9, wherein a length L of a contact area between the first area and the fourth area in a radial direction meets the following condition: $0.2 \text{ mm} \leq L \leq 0.8 \text{ mm}$, and the radial direction is perpendicular to the optical axis of the first step structure lens comprising the first area.

13. The optical lens according to claim 9, wherein the second lens is a glass lens, and the third lens to the seventh lens are plastic lenses, wherein each of object side surfaces of the fourth lens to the seventh lens is provided with the first step structure, and each of image side surfaces of the third lens to the sixth lens is provided with the second step structure, and wherein the object side surface of the first step structure lens provided with the first step structure is in contact with the image side surface of the second step structure lens provided with the second step structure.

14. A camera module, comprising:
a photosensitive element; and
an optical lens, comprising:
a plurality of coaxially disposed lenses, comprising:
a first lens, wherein the first lens has a negative focal power, an object side surface of the first lens is concave in a paraxial position, and an image side surface of the first lens is convex in a paraxial position;
a second lens, wherein the second lens has a positive focal power;
a third lens, wherein the third lens has a negative focal power;
a fourth lens, wherein the fourth lens has a positive focal power;
a fifth lens, wherein the fifth lens has a negative focal power;
a sixth lens, wherein the sixth lens has a focal power; and
a seventh lens, wherein the seventh lens has a focal power, an object side surface of the seventh lens is convex in a paraxial position, and an image side surface of the seventh lens is concave in a paraxial position, and wherein
the first lens, the second lens, the third lens, the fourth lens, the fifth lens, the sixth lens and the seventh lens are disposed in sequence from an object side to an image side, wherein
an aperture value F# of the optical lens meets: $0.6 \leq F\# \leq 2.0$, and wherein
the photosensitive element is located on an image side of the optical lens, and the photosensitive element is configured to convert, into an electrical signal, an optical image formed by the optical lens.

15. A terminal, comprising:
a camera module, comprising:
a photosensitive element; and
an optical lens, comprising:
a plurality of coaxially disposed lenses, comprising:
a first lens, wherein the first lens has a negative focal power, an object side surface of the first lens is concave in a paraxial position, and an image side surface of the first lens is convex in a paraxial position;
a second lens, wherein the second lens has a positive focal power;
a third lens, wherein the third lens has a negative focal power;
a fourth lens, wherein the fourth lens has a positive focal power;
a fifth lens, wherein the fifth lens has a negative focal power;
a sixth lens, wherein the sixth lens has a focal power; and
a seventh lens, wherein the seventh lens has a focal power, an object side surface of the seventh lens is convex in a paraxial position, and an image side surface of the seventh lens is concave in a paraxial position, and wherein
the first lens, the second lens, the third lens, the fourth lens, the fifth lens, the sixth lens and the seventh lens are disposed in sequence from an object side to an image side, wherein
an aperture value F# of the optical lens meets: $0.6 \leq F\# \leq 2.0$, and wherein
the photosensitive element is located on an image side of the optical lens, and the photosensitive element is configured to convert, into an electrical signal, an optical image formed by the optical lens, wherein
the camera module is configured to:
obtain image data;
at least one processor; and
one or more memories coupled to the at least one processor and storing programming instructions for execution by the at least one processor to:
process the image data.

16. The terminal according to claim 15, wherein the seventh lens is an M-shaped lens, and there are two symmetrical inflection points on each of surface inclination angles of the object side surface and the image side surface of the M-shaped lens except for a vertex center.

17. The terminal according to claim 15, wherein the plurality of coaxially disposed lenses further comprise at least one glass lens and at least one plastic lens, wherein a refractive index of the at least one glass lens changes with a temperature, and the refractive index of the at least one glass lens and the temperature meet: dn/dT>0, wherein a refractive index of the at least one plastic lens changes with a temperature, and the refractive index of the at least one plastic lens and the temperature meet: dn/dT<0, and wherein dn represents a change value of a refractive index per unit time, and dT represents a change value of a temperature per unit time.

18. The terminal according to claim 15, wherein a refractive index of the second lens in light with a wavelength of 587.6 nm meets: $1.4 \leq nd \leq 2.1$.

19. The terminal according to claim 15, wherein the optical lens meets: $F\#^2 \times TTL/IH \geq 2.0$, wherein F# is the aperture value of the optical lens, IH is an image height of the optical lens, and TTL is a total track length of the optical lens.

20. The terminal according to claim 15, wherein a curvature radius R1 of the object side surface of the first lens in the paraxial position and a curvature radius R2 of the image side surface of the first lens in the paraxial position meet: $R1/R2 \geq 0.2$.

* * * * *